United States Patent
Singh

(10) Patent No.: US 11,113,895 B2
(45) Date of Patent: Sep. 7, 2021

(54) SYSTEMS AND METHODS FOR SELECTING SPHERES OF RELEVANCE FOR PRESENTING AUGMENTED REALITY INFORMATION

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

(*) Notice: Subject to any disclaimer, the term of this patent is extended or adjusted under 35 U.S.C. 154(b) by 0 days.

(21) Appl. No.: 17/067,316

(22) Filed: Oct. 9, 2020

(65) Prior Publication Data
US 2021/0027542 A1 Jan. 28, 2021

Related U.S. Application Data

(63) Continuation of application No. 16/466,611, filed as application No. PCT/US2017/066472 on Dec. 14, 2017, now Pat. No. 10,930,082.

(60) Provisional application No. 62/437,458, filed on Dec. 21, 2016.

(51) Int. Cl.
*G06T 19/00* (2011.01)
*G06K 9/00* (2006.01)
*G06T 15/20* (2011.01)

(52) U.S. Cl.
CPC ........ *G06T 19/006* (2013.01); *G06K 9/00671* (2013.01); *G06T 15/205* (2013.01)

(58) Field of Classification Search
None
See application file for complete search history.

(56) References Cited

U.S. PATENT DOCUMENTS

| | | | |
|---|---|---|---|
| 9,607,436 B2 | 3/2017 | Malamud |
| 9,690,457 B2 | 6/2017 | Levien |
| 9,712,574 B2 | 7/2017 | Bosworth |
| 9,864,909 B2 | 1/2018 | Bare |
| 2012/0019557 A1 | 1/2012 | Aronsson |
| 2012/0075341 A1 | 3/2012 | Sandberg |

(Continued)

FOREIGN PATENT DOCUMENTS

| | | |
|---|---|---|
| GB | 2513865 A | 11/2014 |
| WO | 2015081313 A9 | 6/2015 |

OTHER PUBLICATIONS

International Preliminary Report on Patentability for PCT/US2017/066472 completed on Dec. 11, 2018, 14 pages.

(Continued)

*Primary Examiner* — Frank S Chen
(74) *Attorney, Agent, or Firm* — Invention Mine LLC

(57) ABSTRACT

Augmented reality information may be presented to a user without overloading the user with an extraordinary amount of information. AR information may be selectively presented to the user in iterative ranges from the user in the user's field of view. Real-world objects in the user's field of view may be detected. A first group of objects may be selected that are less than a first distance from the user in the field of view, and a second group of objects selected that are between the first distance and a second greater distance in the field of view. At a first time, the first group of objects may be augmented to the user. At a second time after the first time, the second group of objects may be augmented to the user. The first group may stop being augmented prior to the second time.

20 Claims, 16 Drawing Sheets

(56) References Cited

U.S. PATENT DOCUMENTS

| | | |
|---|---|---|
| 2012/0075433 A1 | 3/2012 | Tatzgern |
| 2012/0098859 A1 | 4/2012 | Lee |
| 2013/0342574 A1 | 12/2013 | Tseng |
| 2014/0168262 A1 | 6/2014 | Forutanpour |
| 2014/0184496 A1 | 7/2014 | Gribetz |
| 2014/0204119 A1 | 7/2014 | Malamud |
| 2015/0054726 A1 | 2/2015 | Brancato |
| 2015/0078667 A1 | 3/2015 | Yun |
| 2015/0262428 A1 | 9/2015 | Tatzgern |
| 2016/0170998 A1 | 6/2016 | Frank |
| 2016/0240011 A1 | 8/2016 | Fedosov |
| 2017/0053186 A1 | 2/2017 | Allen |
| 2017/0127132 A1 | 5/2017 | Shekhar |
| 2018/0310870 A1 | 11/2018 | Givon |
| 2018/0357803 A1 | 12/2018 | Zhang |
| 2019/0073547 A1 | 3/2019 | El Kaliouby |
| 2019/0147347 A1 | 5/2019 | Ng |
| 2019/0147348 A1 | 5/2019 | Ng |
| 2019/0147349 A1 | 5/2019 | Ng |
| 2019/0160382 A1 | 5/2019 | Miyaki |
| 2019/0188281 A1 | 6/2019 | Bivens |
| 2019/0268660 A1 | 8/2019 | El Kaliouby |

OTHER PUBLICATIONS

International Search Report and Written Opinion of the International Searching Authority for PCT/US2017/066472 dated Mar. 19, 2018.

Jankowski, J. et. al., "On the Design of a Dual-Mode User Interface for Accessing 3D Content on the World Wide Web". International Journal of Human-Computer Studies, vol. 71, No. 7, May 8, 2013, pp. 838-857.

Julier, S., et. al., "Information Filtering for Mobile Augmented Reality". Proceedings of International Symposium on Augmented Reality (ISAR), Oct. 5, 2000, pp. 3-11.

Layar, "Geo Layer". Web Archive dated Sep. 12, 2015, available at: http://web.archive.org/web/20150912040730/https://www.layarcom/documentation/browser/howtos/geolocation-layer/, 3 pages.

Wikipedia, "Jaccard Index". Wikipedia web article modified on Dec. 13, 2016, available at: https://en.wikipedia.org/w/index.php?title=Jaccard_index&oldid=754661103, 6 pages.

International Search Report and Written Opinion of the International Searching Authority for PCT/US2018/018006 dated May 17, 2018.

Julier S. et al, "Information Filtering for Mobile Augmented Reality". Proceedings IEEE and ACM International Symposium on Augmented Reality, (ISAR 2000), Oct. 5-6, 2000, pp. 3-11.

Experimedia Project, "Pinpoint Schladming: Geospatial Augmented Reality on Mobile Devices". YouTube link available at: https://www.youtube.com/watch?v=bo1TFR_QpaE&ab_channel=ExperimediaProject, published on Nov. 12, 2013.

CNET, "Meta Glasses Are the Future of Computing". YouTube Link available at: https://www.youtube.com/watch?v=b717JuQXftw&ab_channel=CNET, published on Aug. 9, 2013.

Wikipedia, "Jaccard Index". Wikipedia web article, available at: https://en.wikipedia.org/w/index.php?title=Jaccard_index&oldid=766170736, modified on Feb. 17, 2017.

Korf, R., "Multi-Way Number Partitioning". Proceedings of International Joint Conferences on Artificial Intelligence (IJCAI), available at, http://ijcai.org/Proceedings/09/Papers/096.pdf, (2009), pp. 538-543.

Bell, B., et. al., "View Management for Virtual and Augmented Reality". ACM Symposium on User Interface Software and Technology (UIST 2001), Nov. 11-14, 2001, pp. 101-110.

International Preliminary Report on Patentability for PCT/US2018/018006 dated Aug. 20, 2019, 8 pages.

Microsoft, For Statement (C++). Microsoft web link, available at: https://docs.microsoft.com/en-us/cpp/cpp/for-statement-cpp?view=vs-2019, Nov. 3, 2016 4 pages.

Moderenes, "Sleep and Wait". Moderenes web link, available at: https://www.modernescpp.com/index.php/sleep-and-wait, Sep. 26, 2016, 7 pages.

Initial View: Show AR about visible objects in nearest sphere

Some time elapses: Show AR about objects in the second sphere

- ◆ User
- ☐ Hidden AR Info
- ▨ Presented AR Info
- ⟨ User's view angle

Scene changes (new object with AR information arrives): show AR about objects in the first sphere (reset)

User turns around: show AR about visible objects in the first sphere again (reset)

SYSTEMS AND METHODS FOR SELECTING SPHERES OF RELEVANCE FOR PRESENTING AUGMENTED REALITY INFORMATION

CROSS-REFERENCE TO RELATED APPLICATIONS

The present application is continuation of U.S. patent application Ser. No. 16/466,611, filed Jun. 4, 2019, which is a national stage application under 35 U.S.C. 371 of International Application No. PCT/US2017/66472, entitled SYSTEMS AND METHODS FOR SELECTING SPHERES OF RELEVANCE FOR PRESENTING AUGMENTED REALITY INFORMATION, filed on Dec. 14, 2017, which claims benefit under 35 U.S.C. § 119(e) from U.S. Provisional Patent Application Ser. No. 62/437,458, filed Dec. 21, 2016, entitled "SYSTEMS AND METHODS FOR SELECTING SPHERES OF RELEVANCE FOR PRESENTING AUGMENTED REALITY INFORMATION", which are incorporated herein by reference in its entirety.

TECHNICAL FIELD

This disclosure relates to systems and methods for augmented reality devices. More specifically, this disclosure relates to systems and methods for managing presentation of augmented reality content to users of augmented reality devices.

BACKGROUND

Augmented reality (AR) is an emerging technology that allows users to augment their perception of the world, through use of AR head-mounted displays (HMDs), both transparent and opaque, display screens, and various other types of devices. Current AR approaches provide AR information about real-world objects that are in a user's field of view, including objects that may be too far away to be discerned by the user. Such approaches may overwhelm the user with AR information, especially in environments where there are many real-world objects in the user's field of view for which information is available for presentation to the user. After a while, such information can become less and less relevant to the user. In some upcoming AR approaches, only information about real-world objects on which the user's gaze rests is provided. However, although such approaches provide AR information about fewer real-world objects, they select the real-world objects to be only those that the user's gaze rests on. This would work only for objects that are sufficiently close to the user for the user's gaze to be recognized as resting upon them. Additionally, the gaze-based approaches call for a user to take the initiative and thus do not bring unanticipated or unknown information to the user. For example, if the user is not aware that a concert will be held in a nondescript park nearby, the user would not gaze at the park long enough to be presented that information.

SUMMARY

Systems and methods set forth herein inform a user of information that may not be in the user's immediate gaze, without overloading the user with an extraordinary amount of information. Embodiments described herein inform the user in a way that is helpful but not intrusive and does not require the user to take the initiative. Further, embodiments described herein inform the user in a way that reduces interference with the scene and streamlines the presentation of information so that the user's attention and cognition are not overloaded.

In some embodiments, systems and methods are described for selecting augmented reality information about one or more real-world objects for display in a user's view comprising, iteratively, receiving one or more pairs of information, each pair comprising (a) one real-world object identified by its geospatial coordinates, and (b) its associated AR object (that specifies and renders some associated augmented information in a suitable manner, including the name and other attributes of the real-world object), determining two or more spheres of relevance of increasing radii and centered on the user, determining the relevant sphere for current presentation to the user, and displaying AR objects from among the received real-world objects whose coordinates lie within the current relevant sphere and within no inner sphere and not displaying any other AR objects.

BRIEF DESCRIPTION OF THE DRAWINGS

A more detailed understanding may be had from the following description, presented by way of example in conjunction with the accompanying drawings in which like reference numerals in the figures indicate like elements, and wherein.

EXAMPLE NETWORKS FOR IMPLEMENTATION OF THE EMBODIMENTS

Figure 1A:
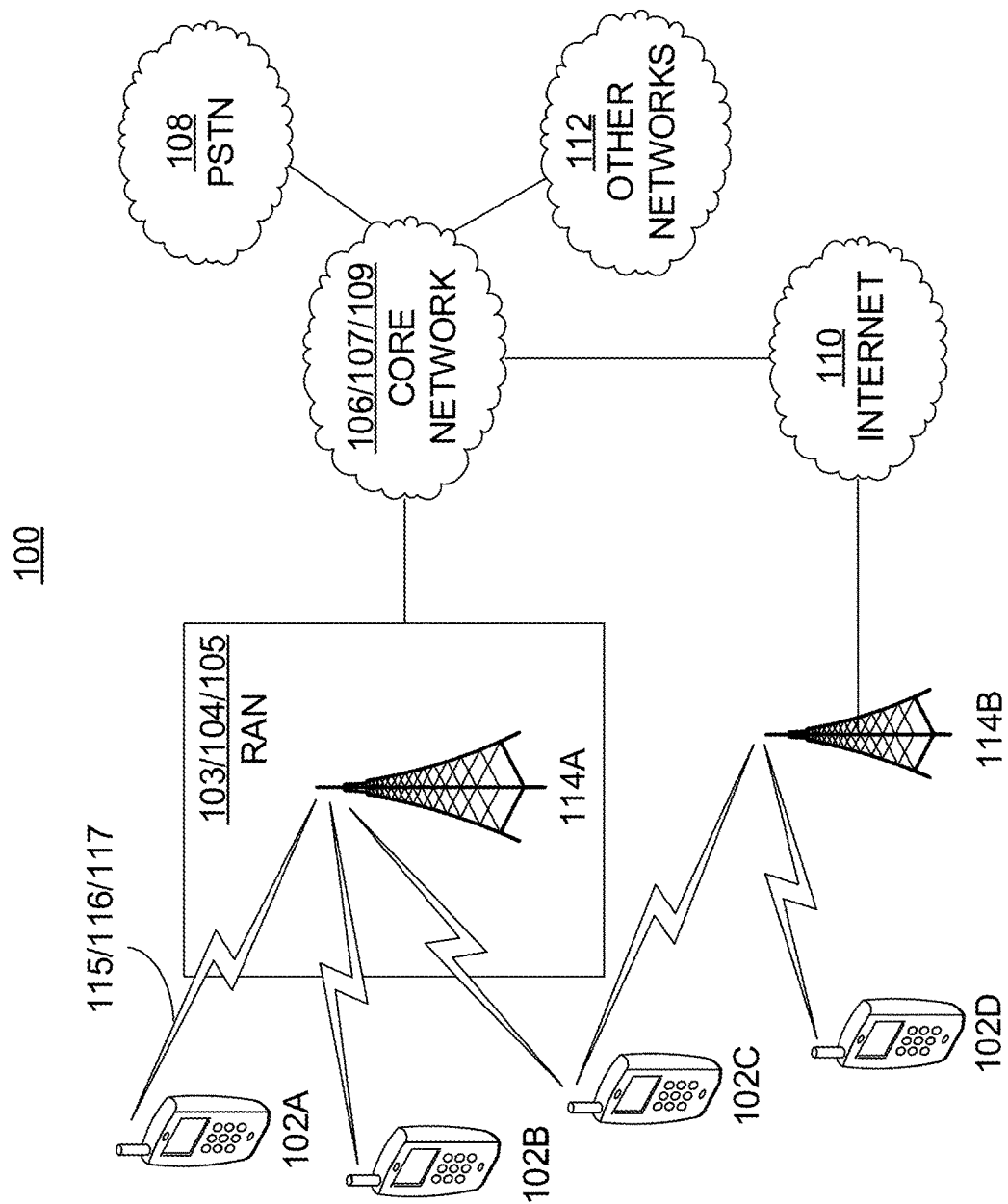
FIG. 1A depicts an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

Figure 1B:
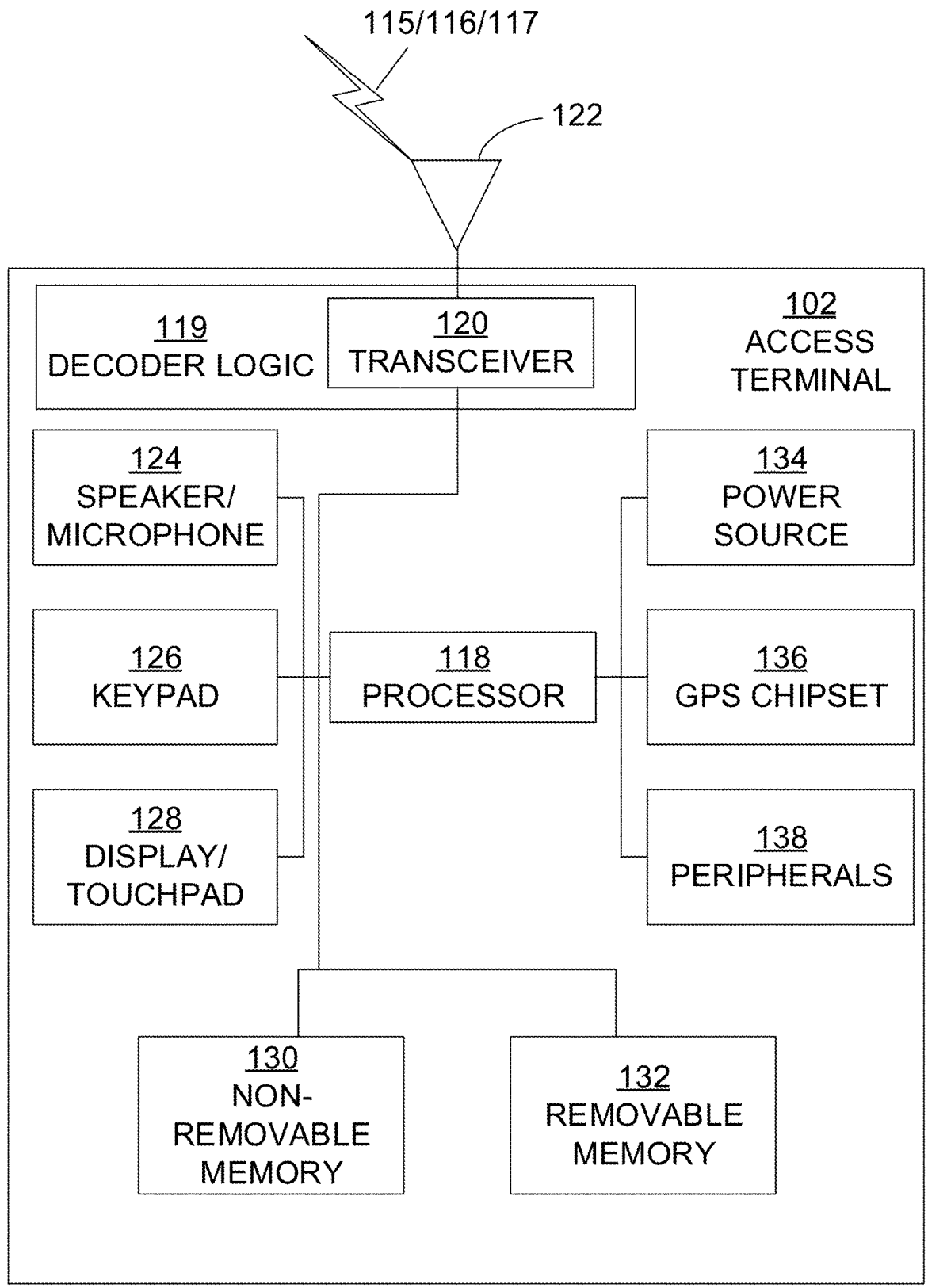
FIG. 1B depicts an example wireless transmit/receive unit (WTRU) that may be used within the communications system of FIG. 1A.
Figure 1C:
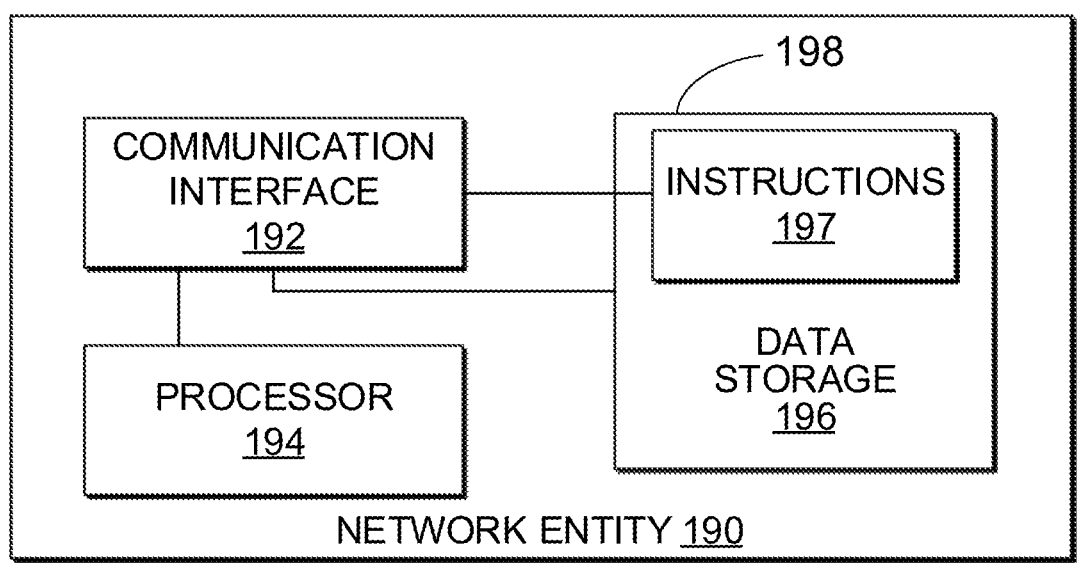
FIG. 1C depicts an exemplary network entity that may be used within the communication system of FIG. 1A.

The systems and methods relating to efficient use of AR devices may be used with the wireless communication systems described with respect to FIGS. 1A-1C. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/ 105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers (one for each sector of the cell). In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like).

The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E UTRA), which may establish the air interface 115/116/117 using Long Term Evolution (LTE) and/or LTE Advanced (LTE A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS 2000), Interim Standard 95 (IS 95), Interim Standard 856 (IS 856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all the elements depicted in FIG. 1B and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/

117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands-free headset, a Bluetooth® module, a frequency modulated (FM) radio unit, a digital music player, a media player, a video game player module, an Internet browser, and the like.

FIG. 1C depicts an example network entity 190 that may be used within the communication system 100 of FIG. 1A. As depicted in FIG. 1C, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1C, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1C. In some embodiments, one or more of such functions are carried out by a set of multiple network entities in combination, where each network entity has a structure similar to that of network entity 190 of FIG. 1C. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node B 140a, Node B 140b, Node B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP HA 184, AAA 186, and gateway 188. And certainly other network entities and/or combinations of network entities could be used in various embodiments for carrying out the network-entity functions described herein, as the foregoing list is provided by way of example and not by way of limitation.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Methods and systems are described for selecting augmented reality information without necessarily requiring active participation by human user. Various embodiments may address the problem of information overload, which is likely to worsen as more AR applications are deployed and more augmented information becomes available.

Methods and systems described herein organize augmented information into spheres (or shapes) of relevance centered on a user. Embodiments first provide information about nearby objects, then about farther objects, and even farther objects, and so on, before cycling back to again present information about nearer objects. In an exemplary embodiment, in response to a significant change in the scene or available augmented information, an exemplary system resets to displaying the sphere nearest to the user. If one or more new objects with augmented information arrive, an exemplary embodiment may prioritize the display of augmented information to the nearest of such new objects.

Further, methods and systems herein described below are passive in that they do not require actions by a user; nor do they require a user's preferences to be captured. However, the embodiments are modular in that they may be readily combined with active, gaze-based, and preference-oriented approaches (when such information is available), and which may be appropriate in some usage scenarios.

Methods and systems are described for new ways of informing user of information that may not be in the user's gaze, without overloading the user with an extraordinary amount of information. Embodiments described herein inform the user in a way that is helpful but not intrusive and does not require the user to take the initiative. Further, embodiments described herein inform the user in a way that reduces interference with the scene and streamlines the presentation of information so that the user's attention and cognition are not overloaded.

In some embodiments, systems and methods are described for selecting augmented reality information about one or more real-world objects for display in a user's view comprising, iteratively, receiving one or more pairs of information, each pair comprising (a) information identifying a real-world object, e.g., by its geospatial coordinates, and (b) an associated AR object (that specifies and renders some associated augmented information in a suitable manner, including the name and other attributes of the real-world object), determining two or more spheres of relevance of increasing radii and centered on the user, determining the relevant sphere for current presentation to the user, and displaying AR objects from among the received real-world objects whose coordinates lie within the current relevant sphere and within no inner sphere and not displaying any other AR objects. In some embodiments, determining the relevant sphere for current presentation comprises setting the relevant sphere as the innermost sphere within which at least one received real-world object lies if there is no prior case or if the user's view has changed substantially. In such embodiments, a view changes due to change of the user's location, the user's head movement, change of the user's posture. In some embodiments, determining the relevant sphere for current presentation comprises setting the relevant sphere to the sphere centered on the user's eyes within which the nearest newly received real-world object lies if a pair of a real-world object and an AR object is received that was not present in the pairs received in the previous iteration. In some embodiments, determining the relevant sphere for current presentation comprises setting the relevant sphere to the next sphere centered on the user's eyes (and cycling back to the innermost sphere if the current sphere is the outermost of the spheres) if the relevant sphere has not changed over a preset duration, e.g., 20 seconds. It should be noted that using spheres should not be considered limiting. In some embodiments, other geometric shapes may be used instead of spheres, such as cubes, ovoids, as well as various other known fundamental geometric shapes.

In some embodiments, when a sphere is used for a second or later time (due to the rotation), the AR objects that were previously displayed in that sphere are not displayed. In some embodiments, spheres are used whose diameters increase in some progression, e.g., 5 meters, 10 meters, 25 meters. In some embodiments, if all objects previously displayed in the current sphere move out of that sphere, then the method sets the relevant sphere to the next sphere in the rotation. In some embodiments, other AR objects besides those that lie within the current most relevant sphere may also be displayed.

Figure 2:
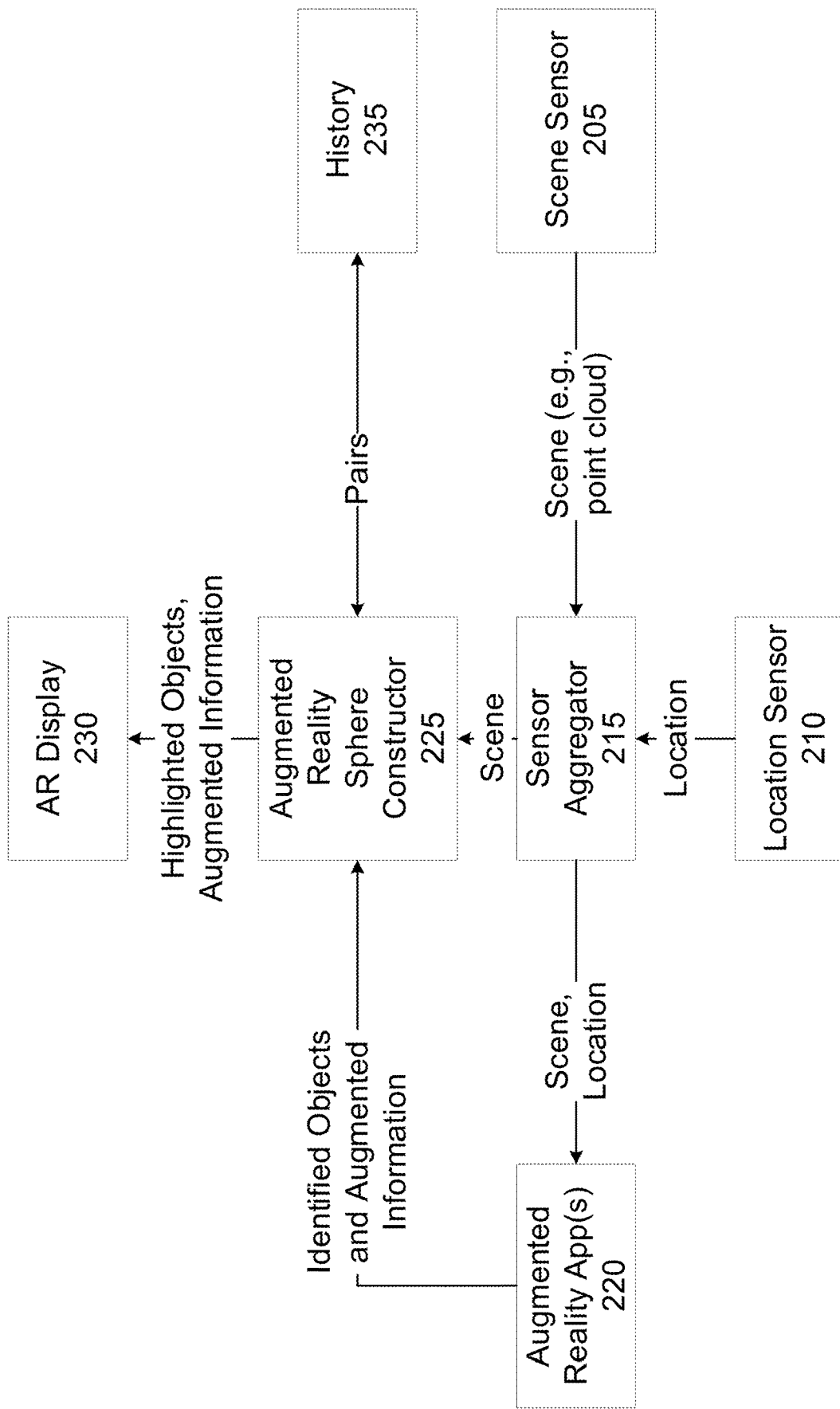
FIG. 2 is a block diagram of a possible architecture, in accordance with some embodiments.

FIG. 2 is a diagram illustrating a possible architecture, in accordance with some embodiments. As shown, one or more scene sensors 205 (such as a camera, LIDAR, etc.) provide information about a scene around a user, for example as a point cloud. A location sensor 210 (such as GPS) may provide information on the location of the user. A Sensor Aggregator 215 receives the scene and location information from the respective sensors, and sends the information to any appropriate (e.g., subscribed) Augmented Reality Applications 220. It also forwards the scene to the Augmented Reality Sphere Constructor 225. In some embodiments, the Augmented Reality applications 220 may be third-party applications which are independent of a system as disclosed herein. In some embodiments, Augmented Reality applications 220 may receive information about the scene or location (or both), and produce a list of pairs, where each pair comprises information identifying a real-world object (e.g., identified by location coordinates) and an AR object that provides information about that real-world object and describes how to render that information on an AR display.

One component of an exemplary embodiment is the Augmented Reality Sphere Constructor 225. Based on a received scene and location (such as from AR applications 220 and sensor aggregator 215), the AR Sphere Constructor 225 may construct two or more spheres (or other range regions) centered on the user's eyes. The AR Sphere Constructor 225 may receive a list of pairs from each AR app, as specified above, and assemble these lists into a master list of pairs. In some embodiments, the AR Sphere Constructor 225 is configured to determine the relevant sphere and to select the objects that lie within the relevant sphere. Subsequently, the AR Sphere Constructor 225 may send the appropriate instructions to an AR Display 230.

In some embodiments, the AR Sphere Constructor 225 operates on an ongoing basis. It may maintain a history 235 of its current list of pairs. If the list of pairs changes, the AR Sphere Constructor 225 may reevaluate the spheres. In some embodiments, if a new object comes into view, the AR Sphere Constructor 225 may determine the relevant sphere as a sphere within which the new object lies. If no objects (pairs) are within the current sphere, the AR Sphere Constructor 225 may transition to the next of the currently constructed spheres immediately. If no event occurs but a sufficient time passes, the AR Sphere Constructor 225 may transition to the next of the currently constructed spheres.

In some embodiments, the AR Display 230 presents an augmented view of the real world scene to the user. The AR Sphere Constructor 225 may take the input scene and the selected AR objects to determine what to display, and instruct the AR Display 230 accordingly. In some embodiments the AR display 230 may take the form of an AR head-mounted display (HMD). In some embodiments, the HMD may be a transparent display. In some embodiments, the AR HMD may include an opaque screen. In some embodiments, the AR display 230 may take the form of a screen on a smartphone, tablet, or other similar device.

Figure 3:
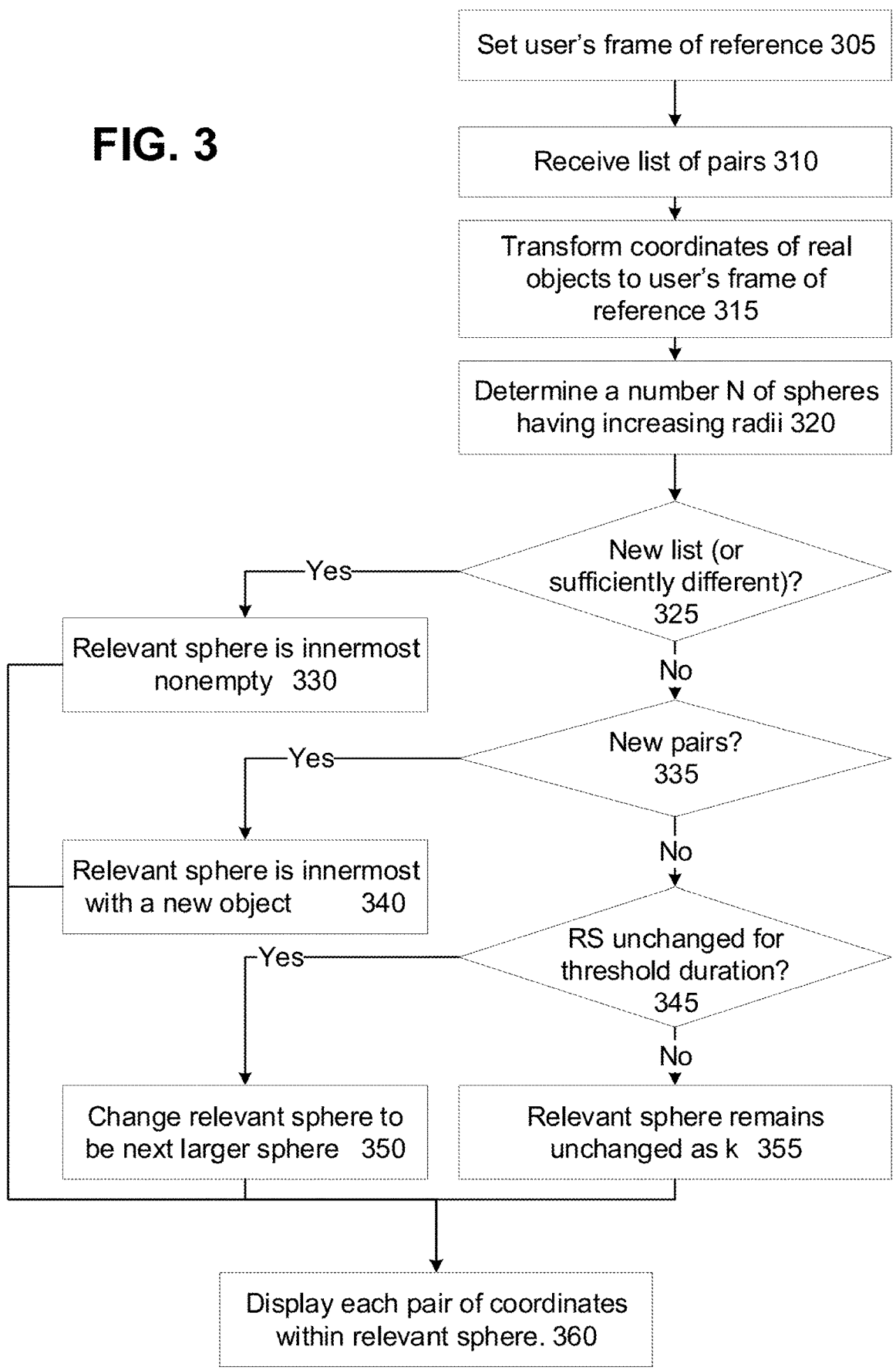
FIG. 3 is a flowchart of a process, in accordance with some embodiments.

FIG. 3 is flowchart capturing the steps performed in exemplary embodiments as described in greater detail below. In the discussion of FIG. 3 and later, "sq" refers to the square function. Notice that the discussion of the flowchart of FIG. 3 uses the index k to identify a sphere (e.g., a spherical shell) that extends from radius r[k] to the next larger radius r[k+1]. The value k=0 refers to the innermost sphere, which extends to k=1. Similarly, the value k=N−1 refers to the outermost sphere, which extends to infinity since r[N]=infinity. For example, for N=2, there are two spheres, the first from 0 to r[1] and the second from r[1] to infinity. Similarly, for N=3, there are three spheres: from 0 to r[1]; from r[1] to r[2]; and from r[2] to infinity.

At some point, a system may set a user's frame of reference (305). For example, the position of the user may be set to <0,0,0>, with X to the right, Y up, and (negative)

Z in the direction of the user's gaze. The system may then receive a list of pairs for <real-world object, AR object>, each pair being associated with real world coordinates (310). The real-world coordinates for each real-world object may be transformed to the user's frame of reference as <x, y, z> (315).

The system may then determine a number N (N>=2) of spheres (320) having radii of r[0]<r[1]< . . . <r[N], where r[0]=0 and r[N]=infinity. That is, an innermost sphere is k=0 and an outermost sphere is k=N−1. In some embodiments, the system may have predetermined the radii of these spheres, while in other embodiments the radii may be based on determined or detected objects.

The system may determine whether it has received a new list of pairs (or a sufficiently different list of pairs from a previous list) (325). For example, it may be determined whether a received list has a Jaccard Index below 0.8 with respect to a previous list. In some embodiments, other evaluation techniques for the difference between a received list and a previous list may be used, as known to those of ordinary skill in the relevant arts, such as but not limited to a Sorenson-Dice coefficient, an overlap coefficient, and the like.

If the received list is new (or sufficiently different), the system may select an innermost nonempty sphere as a relevant sphere (330), by calculating a smallest k, across all pairs <x, y, z>, such that sq(r[k])<=sq(x)+sq(y)+sq(z)<=sq(r[k+1]). The system may then display each pair of coordinates within the relevant sphere (360), and display each pair of coordinates <x, y, z>, such that sq(r[k])<=sq(x)+sq(y)+sq(z)<=sq(r[k+1]).

If, rather, the received list is determined to not be sufficiently different from a previous list, the system may determine whether the received list contains one or more new pairs with respect to the previous list (335). If the received list does have one or more new pairs, the system may select an innermost sphere with a new object as the relevant sphere (340), by calculating the smallest k, across the new pairs <x, y, z>, such that sq(r[k])<=sq(x)+sq(y)+sq(z)<=sq(r[k+1]). The system may then display each pair of coordinates within the relevant sphere (360), and display each pair of coordinates <x, y, z>, such that sq(r[k])<=sq(x)+sq(y)+sq(z)<=sq(r[k+1]).

If it is determined that the received list does not contain any new pairs, the system may determine whether the relevant sphere has been unchanged for a threshold (or preset) duration (345). If the relevant sphere has been unchanged for the threshold (or preset) duration, the system may change the relevant sphere to be the next larger sphere (350), and cycle back to the innermost sphere if at the outermost sphere. In one case, the progression may update the relevant sphere as k=remainder ((k+1)/N). The system may then display each pair of coordinates within the updated relevant sphere (360), and display each pair of coordinates <x, y, z>, such that sq(r[k])<=sq(x)+sq(y)+sq(z)<=sq(r[k+1]).

For clarity, in an exemplary situation in which nothing changes in the available AR information, the spheres may iterate from the smallest to the largest, and back to the smallest. The update by remainder captures this idea. For example, when N=2, a sequence of spheres is described as follows. An initial value may be 0. A next (second) value may be 1, because the relevant sphere is incremented by 1 from 0 to 1, and division of that value by N (2) yields a remainder of 1. A next (third) value may be 0, because the relevant sphere is incremented by 1 from 1 to 2, and division of that value by N (2) yields a remainder of 0.

Similarly, when N=3, this update yields a sequence of spheres as 0, 1, 2, 0, 1, 2, and so on.

If the relevant sphere has not been unchanged for the threshold (or preset) duration, the relevant sphere may remain unchanged as k (355). The system may then continue to display each pair of coordinates within the relevant sphere (360), and display each pair of coordinates <x, y, z>, such that sq(r[k])<=sq(x)+sq(y)+sq(z)<=sq(r[k+1]).

Figure 4:
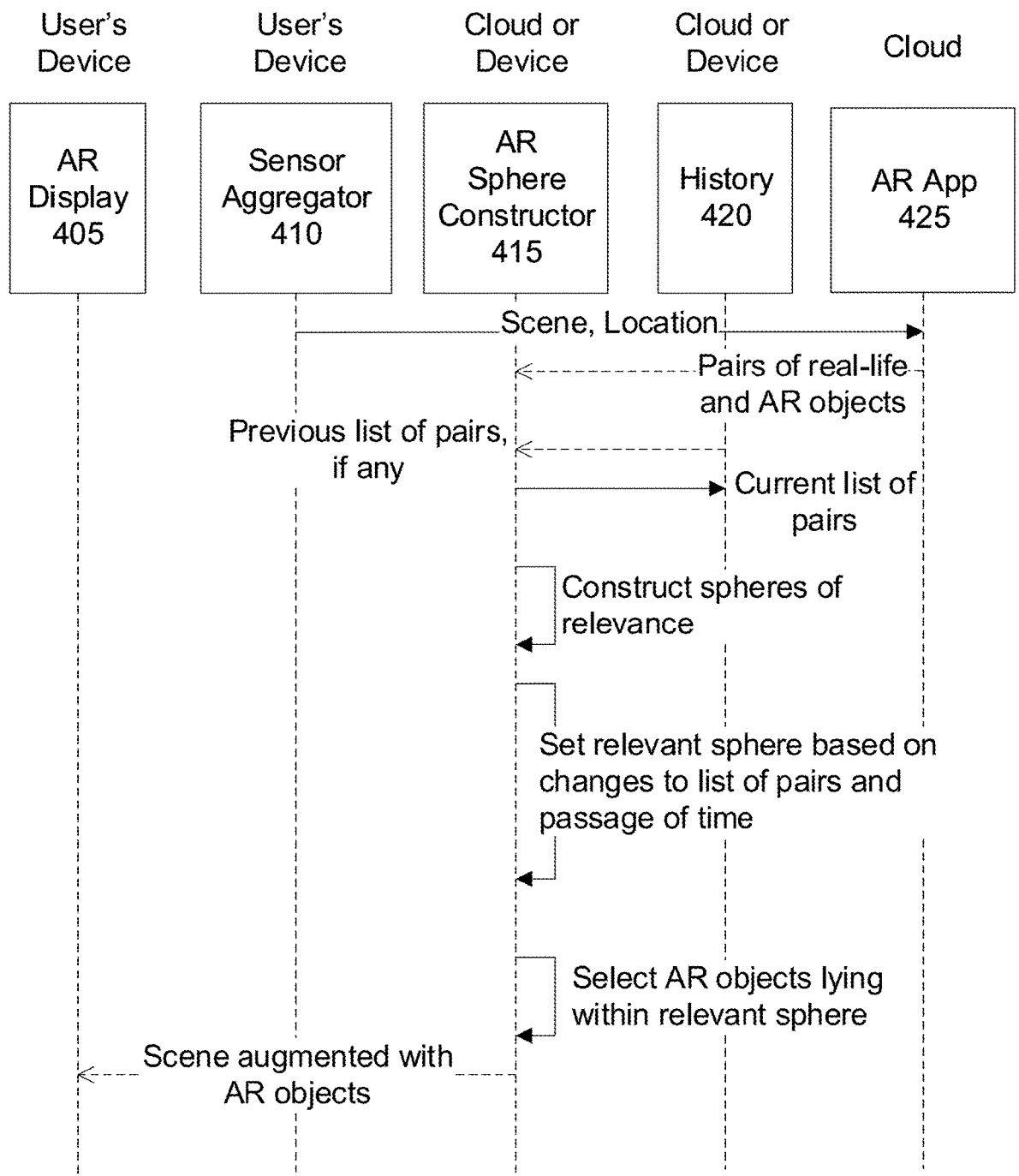
FIG. 4 is a call-flow diagram of a process, in accordance with some embodiments.

FIG. 4 is a sequence diagram illustrating how present embodiments may be realized across the various modules. This sequence diagram is an abstract description showing the main entities and their locations in a possible implementation. As shown, an AR application 425 may receive scene and/or location information from a sensor aggregator 410, which may receive sensor information from sensors on a user's device, which may be an AR HMD, for example. In some embodiments, the sensors may include a GPS to obtain a user's location. In some embodiments, the sensors may include a magnetic compass to provide a viewing direction for the user. In some embodiments, the sensors may include an accelerometer that may provide an indication of the user changing their gaze. In some embodiments, the sensors may include a depth camera to determine how far away the real-world objects are, so that the AR sphere constructor may know in which sphere of relevance to display each real-world/AR object pair. In some embodiments, the sensors may utilize various cameras and 3D sensors such that the AR application may perform image analysis/object recognition to assist in identifying real-world objects, as well as finding or obtaining information to display in or with the AR object.

Using the scene and location information received from the sensor aggregator 410, the AR application 425 may generate pairs of real-world and AR objects, and provide the pairs to the AR Sphere Constructor 415. In some embodiments, the AR application 425 may identify buildings, landmarks, etc., based on location/direction information provided by the sensor aggregator 410, along with an online map program (e.g., Google Maps™, etc.). In some embodiments, the AR application 425 analyzes 3D depth information and/or picture/video information to identify real-world objects such as cars (and color/type), trees/flowers (based on shape of leaf, for example), insects/animals, fountains/statues, among various other real-world objects that may be found interesting to the user. In some embodiments, AR applications 425 may be pre-configured by a user to show things of interest (e.g., trees/animals/flowers for a nature enthusiast, all nearby restaurants for a food enthusiast, etc.). The AR application 425 may access additional types of databases for identifying various types of real-world objects, and the above examples should not be considered limiting.

The AR Sphere Constructor 415 may further receive previous lists of pairs (if any) from a history/memory device 420, and provides the history/memory device 420 with the pairs the AR Sphere Constructor 415 received from the AR application 425. The AR Sphere Constructor 415 then constructs two or more spheres of relevance, and selects a relevant sphere based on (i) changes to the list of pairs and (ii) a passage of time. Once a relevant sphere has been selected, AR objects within the relevant sphere are selected, and the scene with the augmented AR objects is displayed on the user's AR display 405 (such as an HMD).

In some embodiments, spheres may be interpreted as centered on the user's eyes, and constructed by specifying one or more radii between zero and infinity. Accordingly, in some embodiments, the first sphere is between zero and the smallest radius, and the last sphere (or, rather, spherical shell) is between the largest radius and infinity. The radii may follow a simple pattern such as 10 meters, 20 meters, and so on (or 5, 10, 15, . . . , and/or the like). In some cases, the radii may have logarithmic or exponential progression, or the like.

At various stages, the system may operate on pairs of a real-world object (specified via its coordinates) and an AR object (providing information about that real-world object). In some embodiments, a method includes comparing a previous list of pairs to a current list of pairs by comparing each pair in the previous list with each pair in the current list. For example, a previous list's pair may have coordinates <xp, yp, zp>, and a current list's pair may have coordinates <xc, yc, zc>. In one embodiment, the two pairs may be determined as being the same if two tests return true. First, the system may determine if the real-world coordinates of the two pairs (from previous and current lists, respectively) are approximately equal by verifying if the sum of sq(xc−xp)+sq(yc−yp)+sq(zc−zp) is below some preset threshold (e.g., 0.5 meters, 0.2 meters, 0.3 meters, 0.1 meters, 1 meter, etc.). Second, the system may determine if the AR object information of each pair is "equal" by verifying if the AR object information components of the two pairs are identical.

In some embodiments, the system may compute a Jaccard Index using the above computations of agreement between the pairs that occur in the previous and current lists (or some other computations of agreement, as known to those of ordinary skill in the relevant art). The Jaccard Index is used to measure dissimilarity between sample sets. Thus, if the Jaccard Index is below some preset threshold (e.g., 0.8, 0.9, 0.75, etc.), then the lists of pairs are treated as having changed significantly. In some embodiments, other evaluation techniques for the difference between a received list and a previous list may be used, as known to those of ordinary skill in the relevant arts, such as but not limited to a Sorenson-Dice coefficient, an overlap coefficient, and the like.

In some embodiments, two pairs are considered as being "identical" even if there is some variation in the measurement of the coordinates (due to instrument error or slight movements of the user's head and body). However, in some embodiments, if the AR information (metadata) changes even slightly that can mean either that a new real-world object has moved into the position previously occupied by some other object or that an AR application has found it appropriate to produce new information about the same real-world object. In either case, this is a change that may be valuable to the user.

In some embodiments, the method is passive in that it continues even as the user is not taking the initiative. Such embodiments may help the user gradually become familiar with his or her surroundings in a casual, intuitive manner. Further, embodiments described above may track changes to the user's scene and respond appropriately. Some embodiments may be instantiated on top of existing AR applications and displays. In deployed products, embodiments described above may be combined with other techniques, such as receiving prioritized information from AR applications and considering the user's preferences across the available AR information.

In some embodiments, the AR display 405 and sensor aggregator 410 may be components of a user's device. In some embodiments, the AR sphere constructor 415 may be a component of a user's device, or may be a cloud-based component or otherwise remote and in communication with the user's device. In some embodiments, the history 420 of pair lists may be maintained in a memory of the user's device, or in a cloud or remote database/memory. In some embodiments, the AR application(s) 425 may be cloud based, while in other embodiments they may be implemented on the user's device.

In some embodiments, a system may selectively present augmented reality information to a user. The system may detect or otherwise determine a plurality of real-world objects in a field of view of the user. The system may then select from the plurality of real-world objects a first group of at least one real-world object less than a first distance from the user in the field of view. The first distance may be a preset distance (e.g., 5 ft, 10 ft, etc.), or may selected by the system based on the locations of each of the detected plurality of real-world objects. The system may also select from the plurality of real-world objects a second group of at least one real-world object in the field of view of the user between the first distance and a second distance from the user, where the second distance is greater than the first distance. In some embodiments, additional groups of objects for regions extending to further distances may also be selected (e.g., a third group between the second distance and a greater third distance, etc.). In some embodiments, each of the distances may be chosen by the system based on the locations of the real-world objects. The system may augment the first group of real-world objects at a first time. In some embodiments, the first time is a time period of a preset duration (e.g., 20 seconds, 30 seconds, etc.). In some embodiments, the time period may be chosen by the system based on the number of objects in the first group (or similarly chosen by the system for any group based on the size of the group). The system may then augment the second group of real-world objects at a second time after the first time. In some embodiments, the second time may be a time period of a preset duration, or a time period of a duration chosen by the system. In some embodiments, rather than having time periods, the system may augment a group of objects at their associated time, and stop augmenting the group prior to augmenting another group of objects. If there are more than two groups of objects, the system may progressively augment each group at a subsequent time.

In some embodiments, the system may, after the second time, augment the first group of objects at a third time. The system may also augment the second group of objects at a fourth time after the third time. Any other groups may also progressively be augmented again at subsequent times. In some embodiments, the augmenting of groups may be performed cyclically, with each group augmented at different times in each of a plurality of cycles. In some cases, the order of groups in each cycle may be the same, and in others the order may be different (such as depending on detection of additional real-world objects).

In some embodiments, the system may detect one or more additional real-world objects after grouping the originally detected objects. In some cases, such as for an additional object falling within the first distance but detected prior to augmenting the second group of objects, the system may augment the additional object at a third time after the first time but before the second time. After augmenting the additional object, the system may proceed to augmenting the second group. Similarly, if an additional object were detected after augmentation of a second group but before augmentation of a third group between the second distance and a greater third distance, and the additional object falls within the range associated with the first or second group, the system may augment the additional object after the second group but before the third group. If an additional object falls within a group that has not yet been augmented, it may simply be added to the appropriate group and augmented at the same time as the rest of that group.

In some embodiments, such as when a user turns their head, the system may detect the change in field of view. The system may then detect or otherwise determine an updated plurality of real-world objects in the changed field of view of the user. The system may then select groups of objects for each distance range, such as a third group within the first distance and a fourth group between the first and second distances. The system may then progressively augment these groups of objects, such as by augmenting the third group at a third time, and then augmenting the fourth group at a fourth time after the third time.

In some embodiments, the user's field of view may be determined by the system from one or more sensor measurements (such as GPS, compass, etc.), by an image detection process, or the like.

Figure 5A:
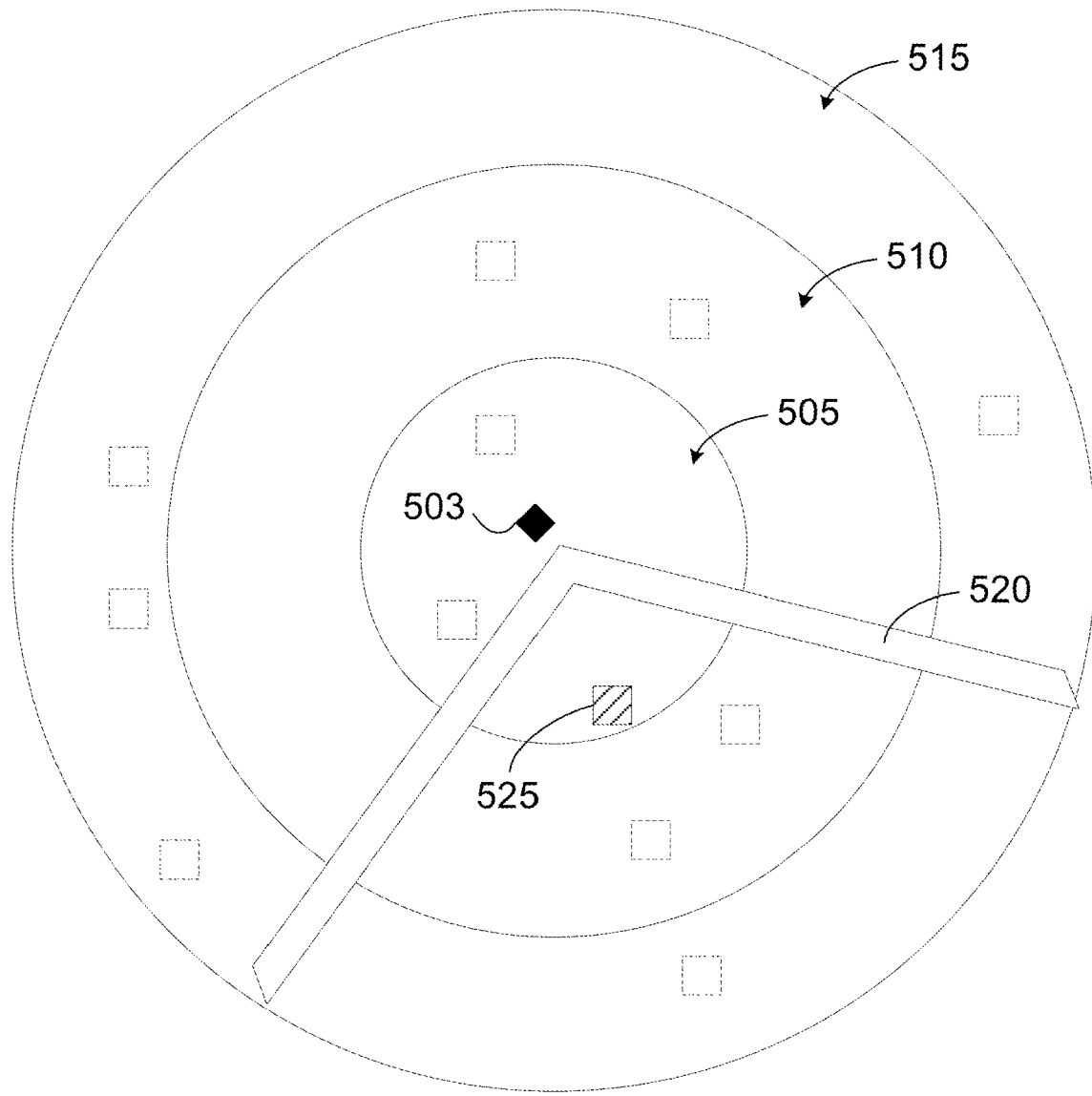
FIGS. 5A-5D illustrate sphere progression for an AR device, in accordance with some embodiments.

FIGS. 5A-5D illustrate a progression of spheres, in accordance with some embodiments. Each diagram shows a user 503 with concentric spheres: 505, 510 and 515. The chevron 520 indicates the view angle (i.e., the smaller angle of the chevron) of the user 503. The received AR objects are scattered about the spheres. As shown in FIG. 5A, there may be AR objects behind the user 503, because some AR apps may work or operate based on location alone. An AR object 525 in the first sphere 505 and within the user's view angle is displayed or otherwise presented, while other AR objects are not.

Figure 5B:
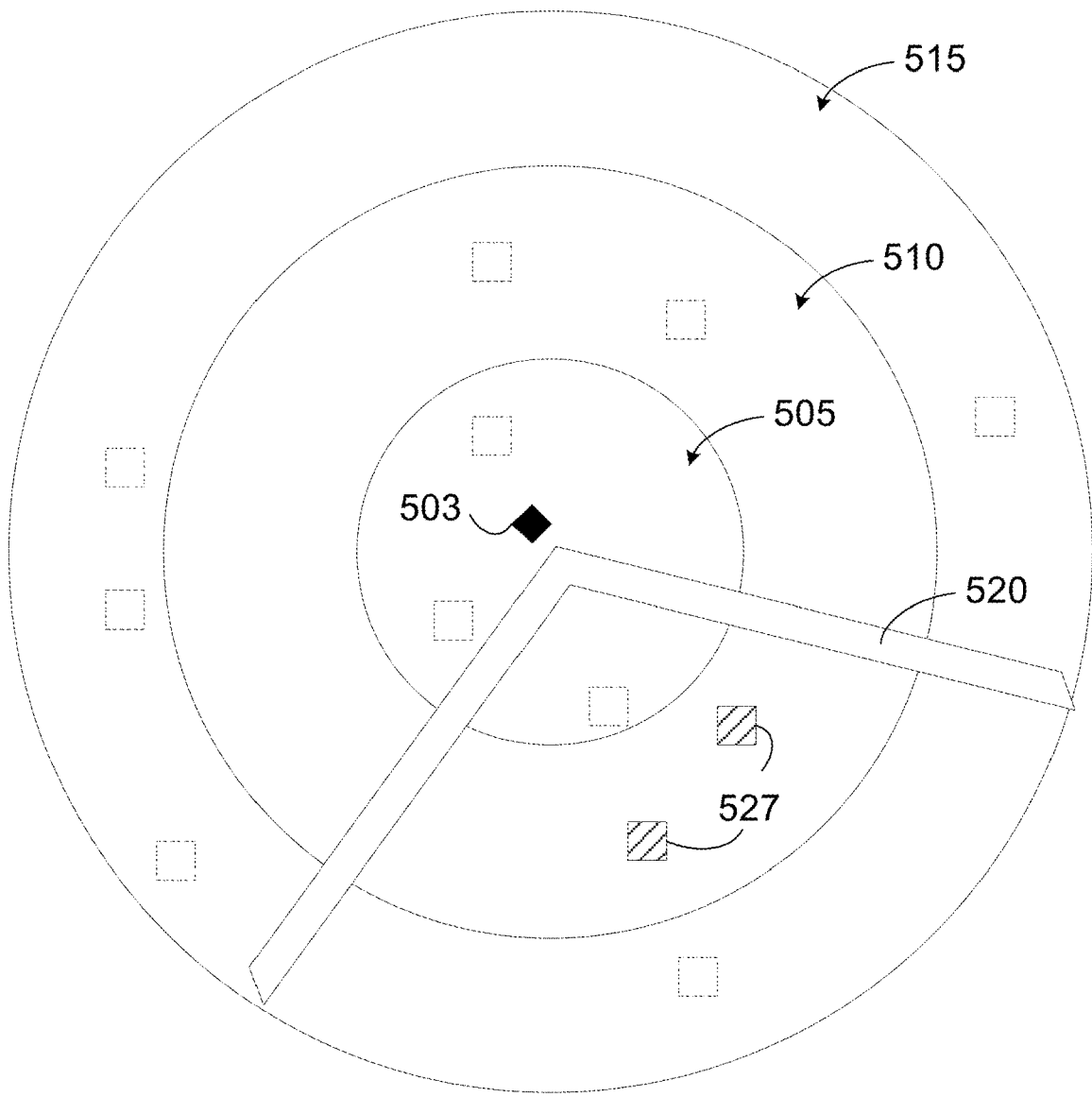
Figure 5C:
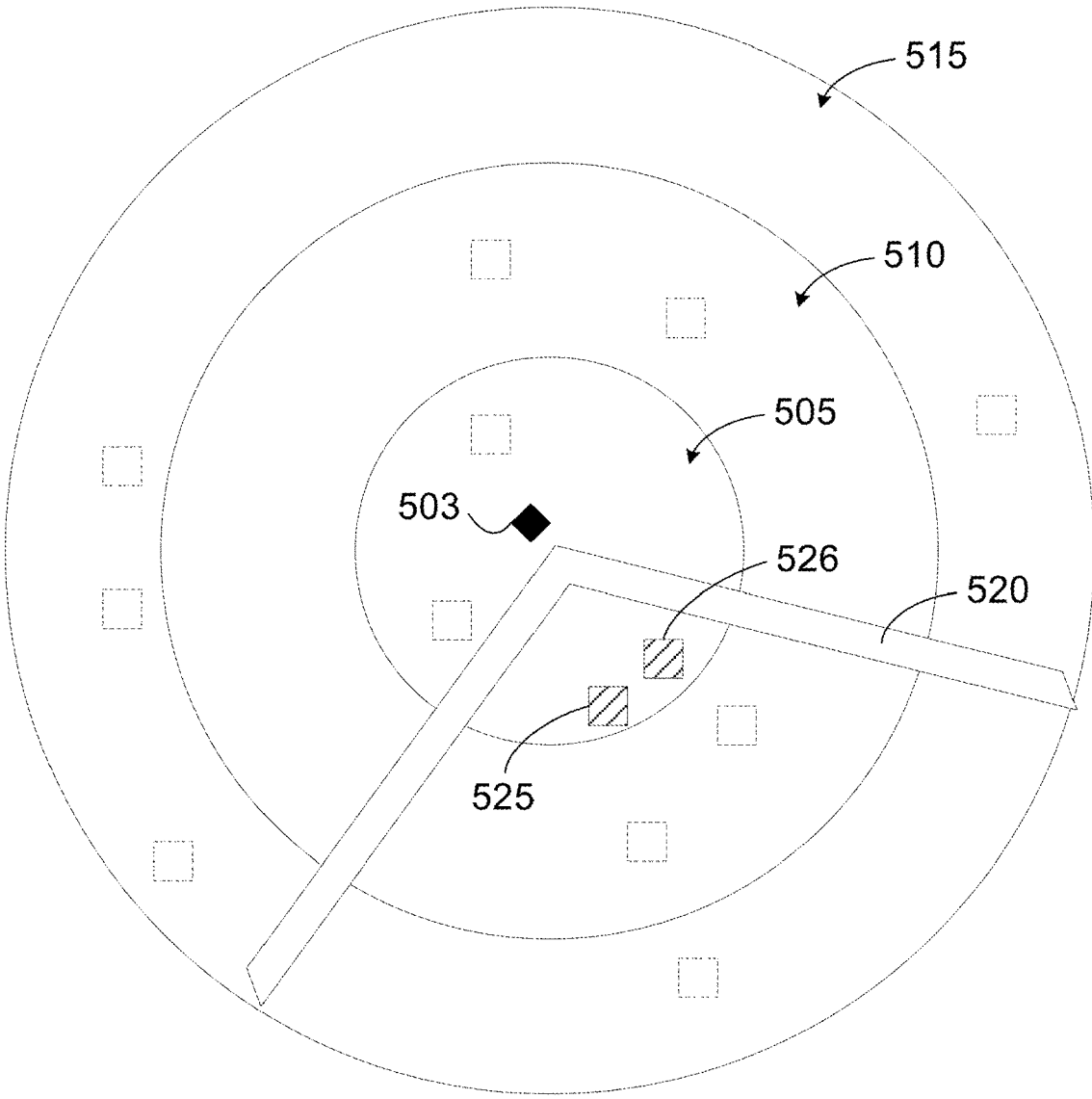
Figure 5D:
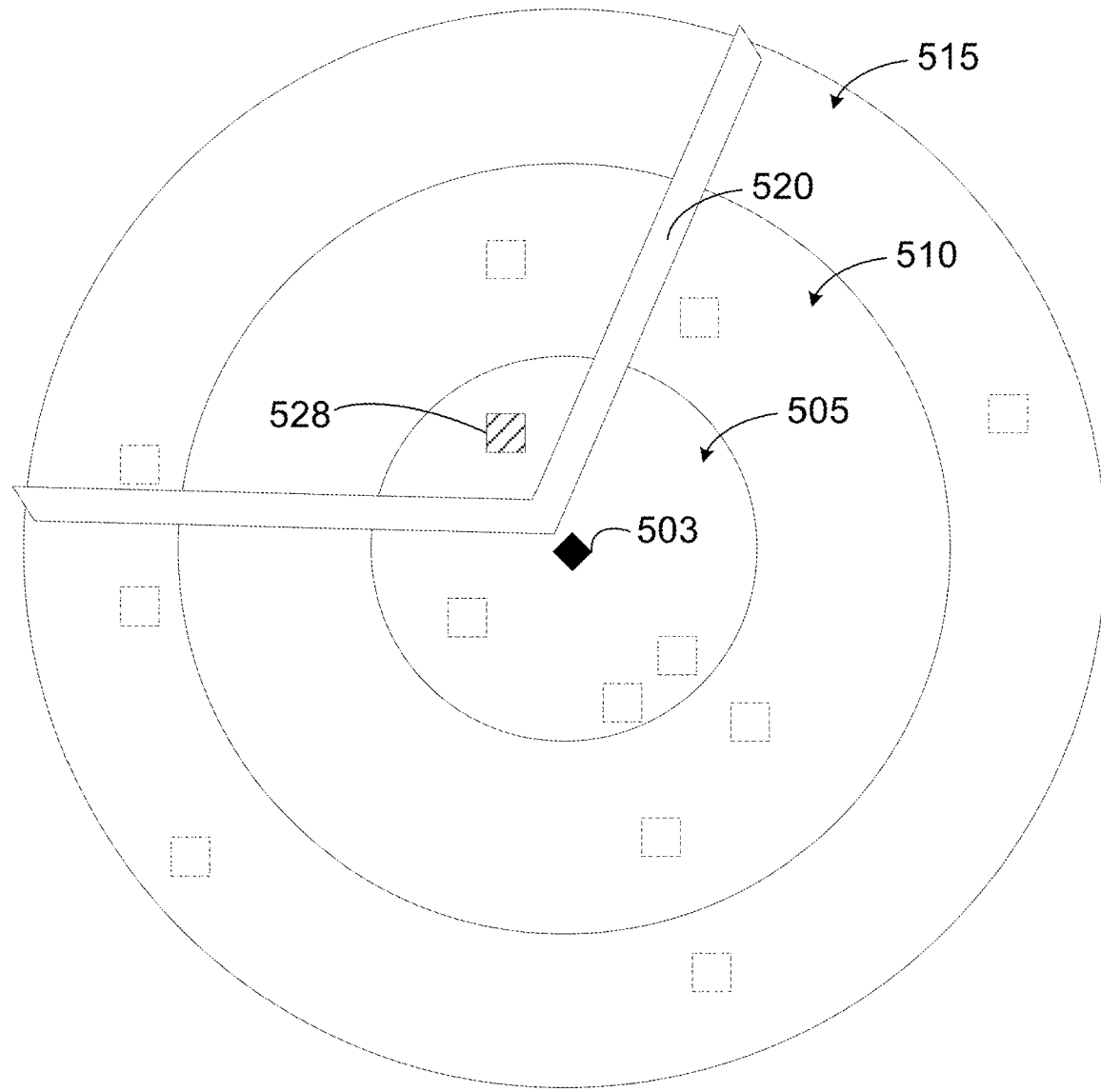

As shown in FIG. 5A, an initial view displays to the user 503 AR information about visible objects 525 in the nearest sphere 505 within the user's viewing angle 520. After some duration (e.g., 20 seconds), the device may show (or present) AR information about visible objects 527 in the second sphere 510 within the user's viewing angle 520, as shown in FIG. 5B. After another duration, an object of interest 526 may move to a location of the innermost sphere 505 within the user's viewing angle 520, and, rather than progressing to the outermost sphere 515, the AR device may reset (or return) to the innermost sphere 505 and display both objects 525 and 526, as shown in FIG. 5C. If at some point the user 503 turns around or otherwise alters their viewing angle 520, the scene visible to the user 503 may change drastically, and the AR device may reset (or return) to the innermost sphere 505, as shown in FIG. 5D, to display or otherwise present AR information for an object 528 that is now within the user's viewing angle 520 in the innermost sphere 505.

Figure 6A:
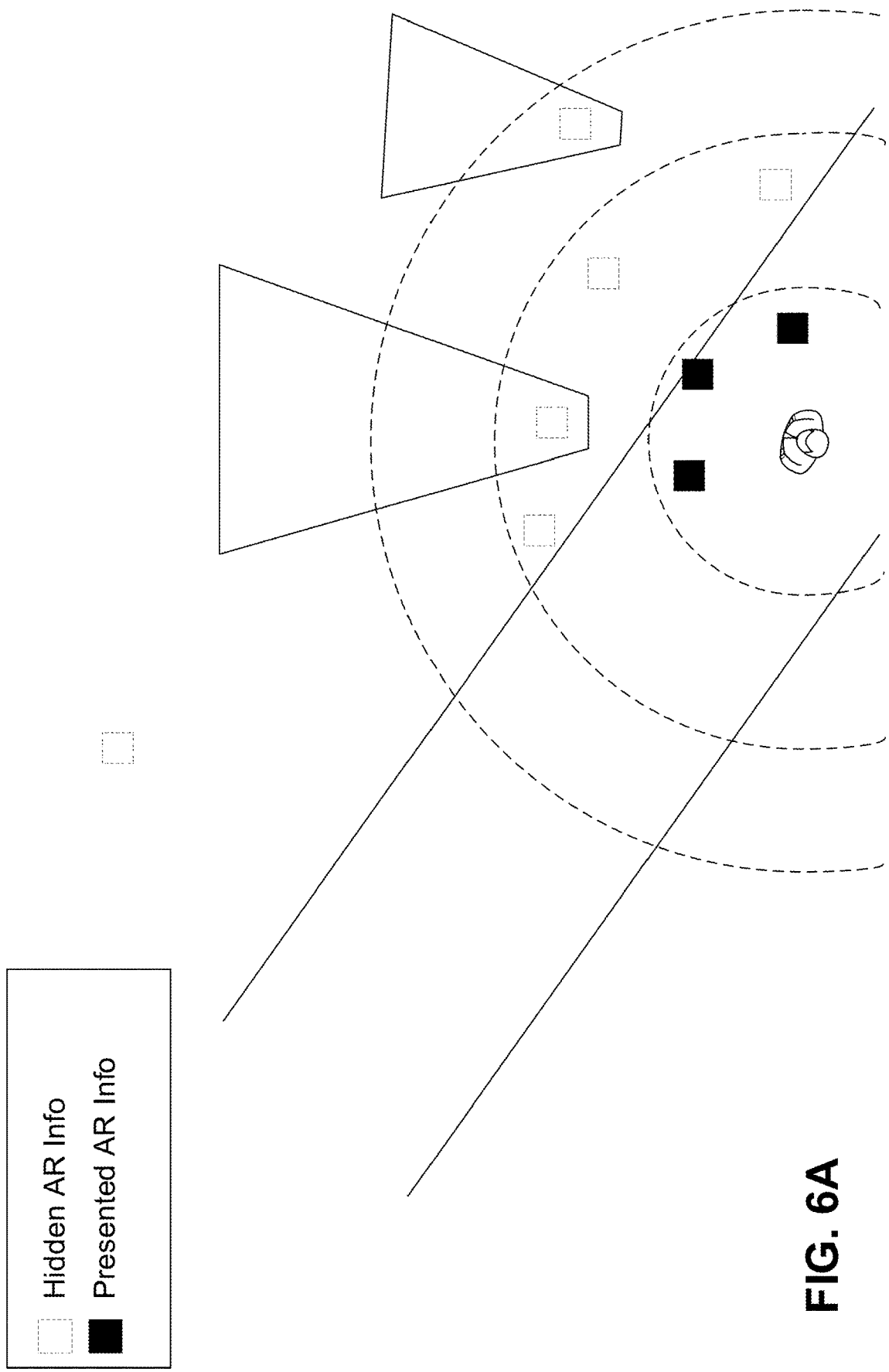
FIGS. 6A-6E illustrate AR information presentation progression, in accordance with some embodiments.
Figure 6B:
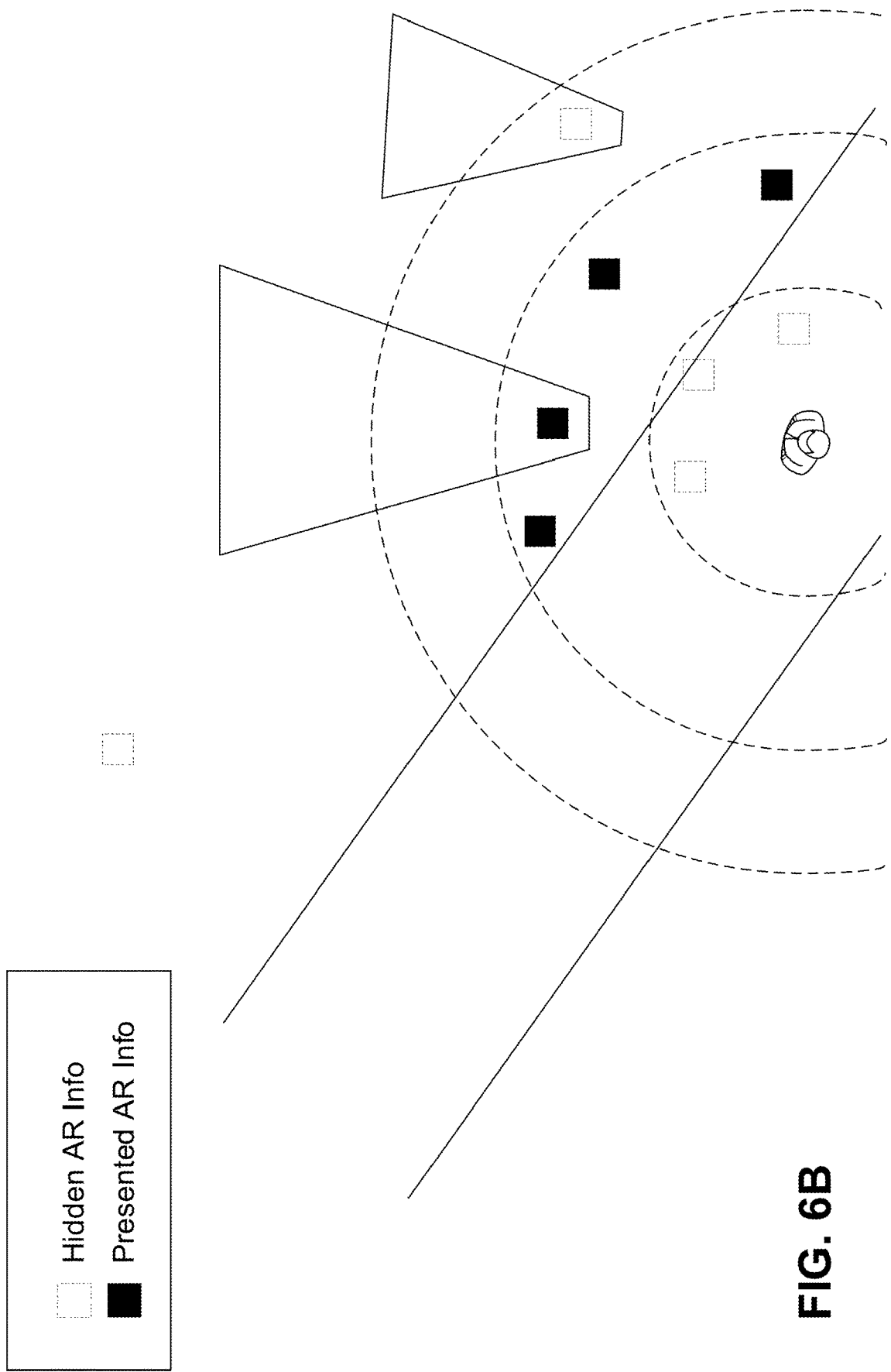
Figure 6C:
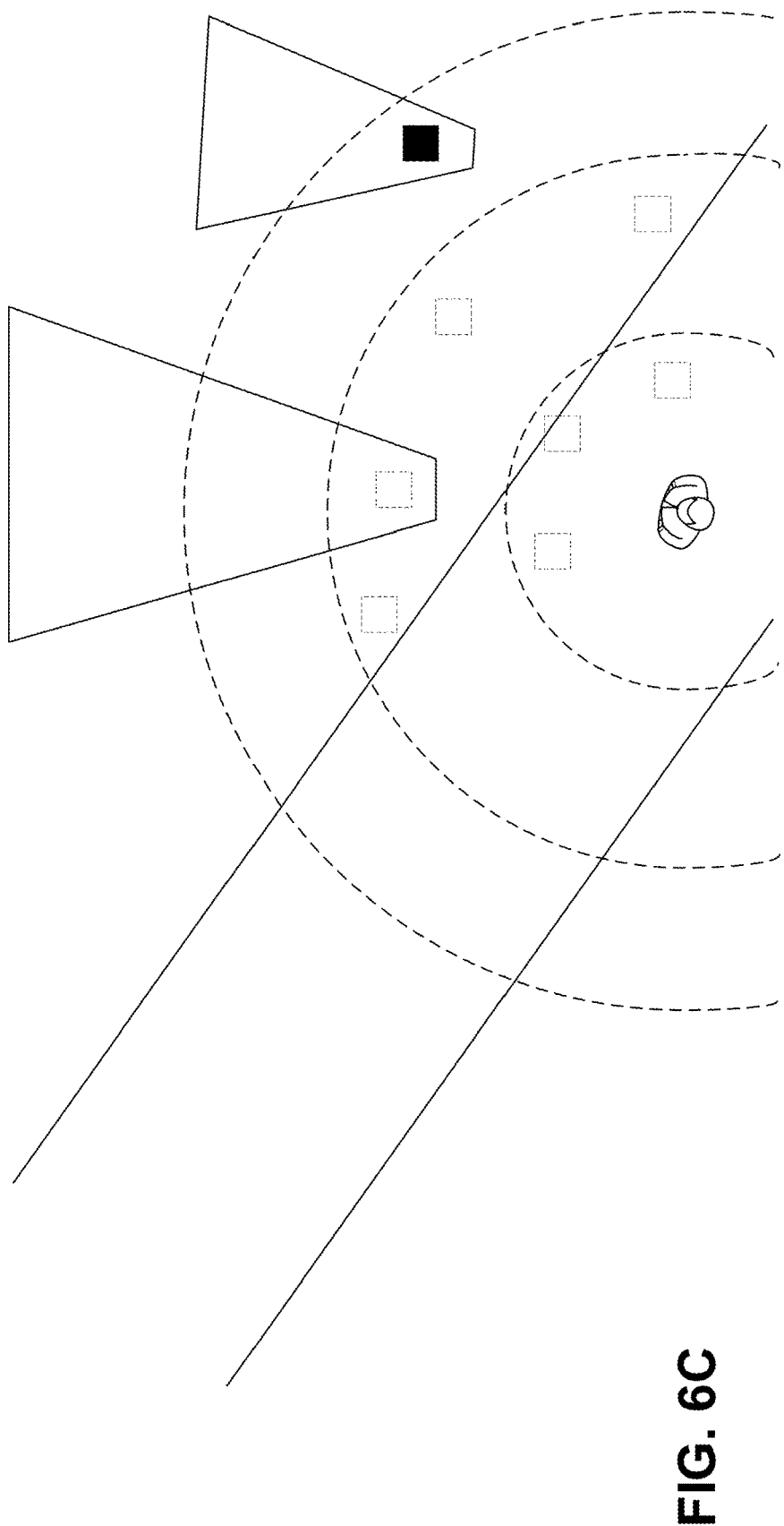

In an exemplary scenario, a user is spending an afternoon in a town square. An AR device first provides the user with information about the square and shops that line the square. An example of this is illustrated by FIG. 6A. After a while, as illustrated by FIG. 6B, the AR device brings forth information about some nearby buildings in a second sphere. A short while later, as illustrated by FIG. 6C, the AR device points out that a landmark is a bit farther away toward the user's right in the third sphere.

Figure 6D:
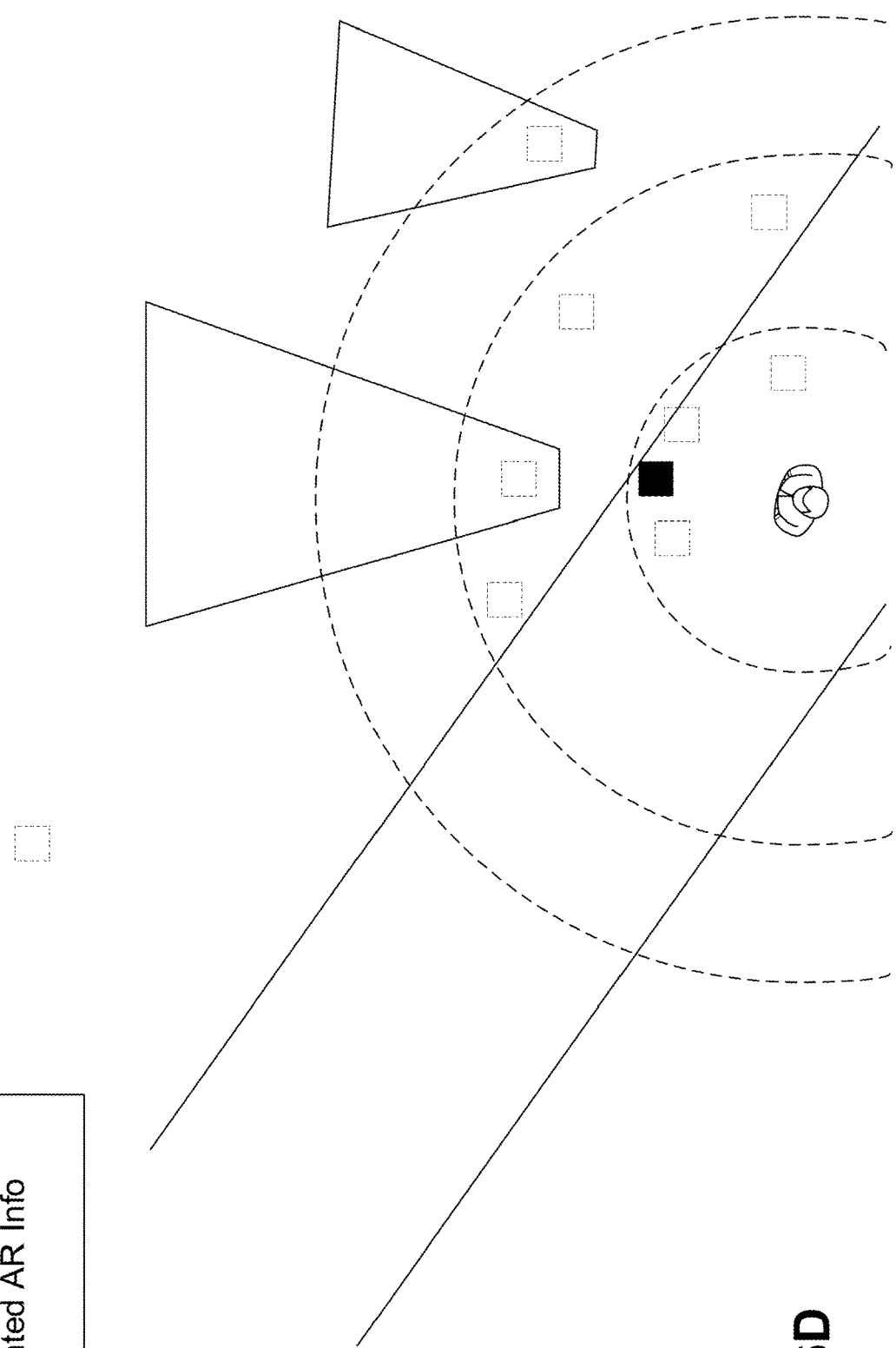

Suddenly, as illustrated by FIG. 6D, a small troupe of dancers come to an empty part of the square near where the user is sitting and begin to set up their portable dance tiles and their musical instruments. Just as the user's attention comes back to the square, the AR device refocuses on the nearby objects and tells her about this dance troupe, which is apparently one of the longest running street performers group. The dancers set up and settle down for some lemonade before their performance. The AR device then tells the user about some objects farther in the distance.

The user's daughter suddenly calls the user's attention with a cry of a seeing a celebrity at a nearby table. The user turns around to look at the table, and the AR device resets to the new scene. The AR device detects it is not the celebrity, just a person with a similar appearance. Later, a procession with a marching band goes by some distance away. Even though it is not in the inner three spheres rendered by the AR device, because it causes a change with a new pair of <band, AR info about the band>, the AR device selects the sphere that contains the band.

Figure 6E:
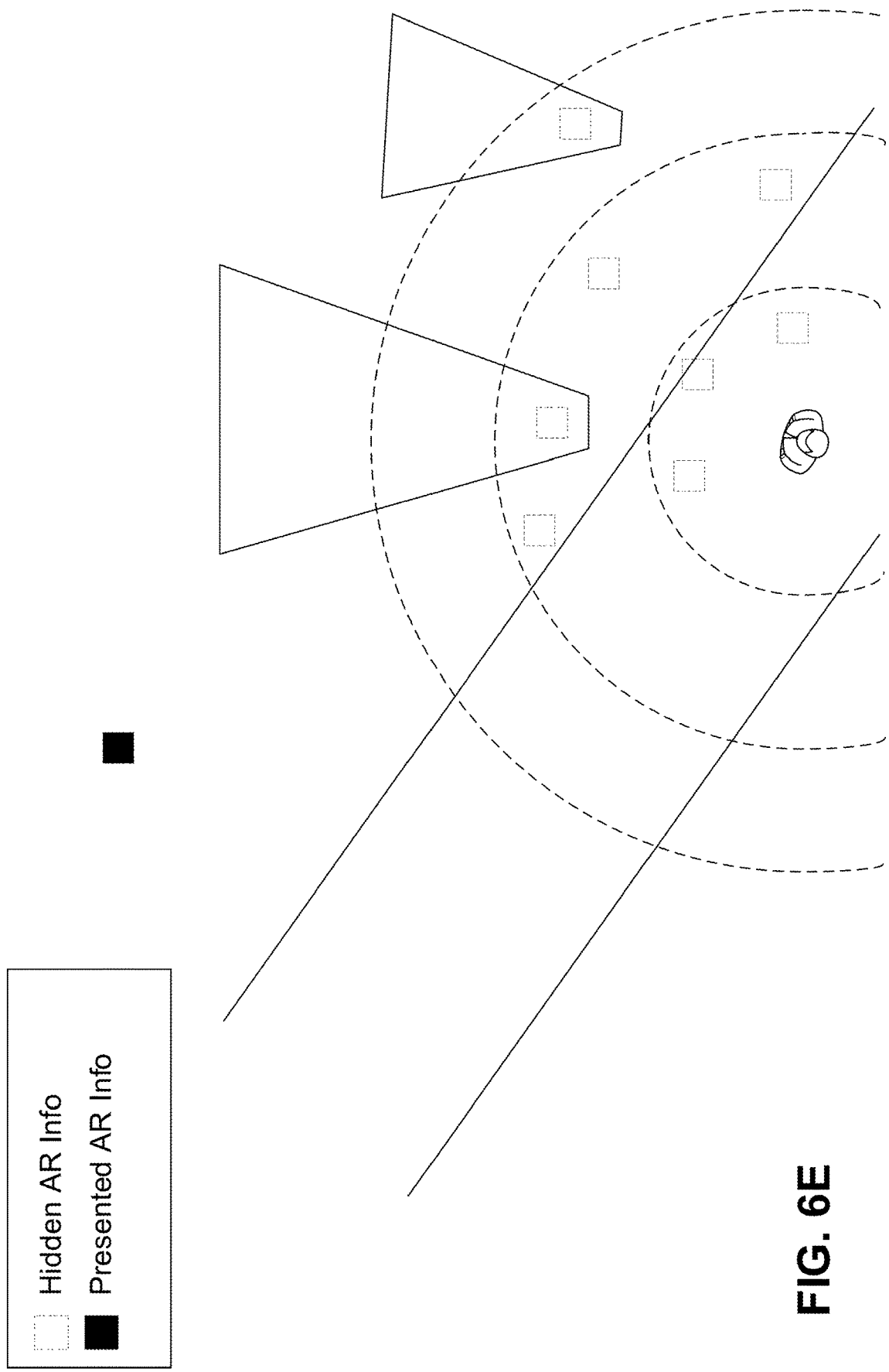

As time passes, the scene settles down. No new real-world objects are appearing in the scene, and the AR device displays AR information for the real-world objects in a fourth sphere, as illustrated by FIG. 6E. In some embodiments, the AR information for objects in the fourth sphere is available after AR information for real-world objects in the first through third spheres has already been shown.

Figure 7:
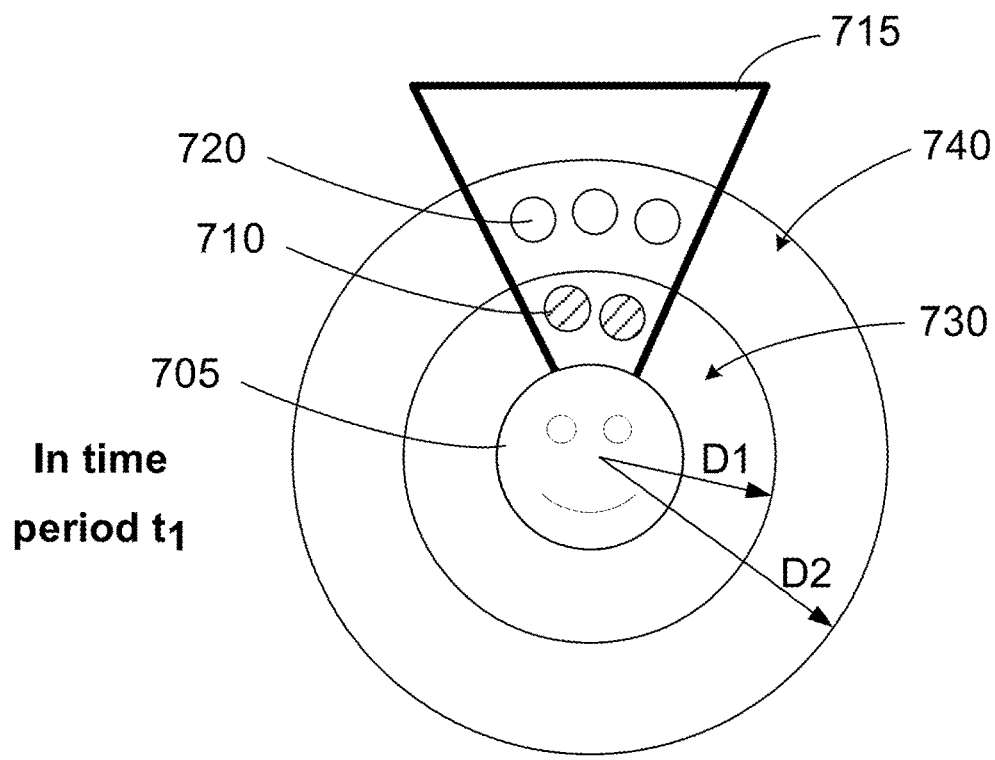
FIG. 7 illustrates a progression of augmenting real-world objects, in accordance with some embodiments.
Figure 7:
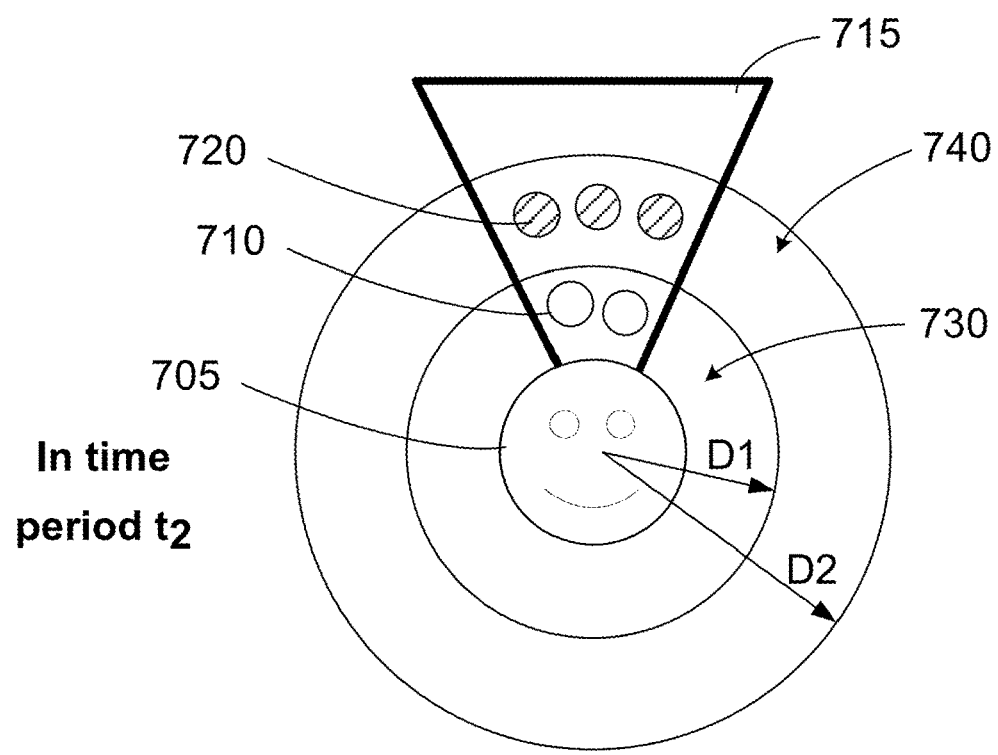

FIG. 7 illustrates a progression of augmenting real-world objects, in accordance with some embodiments. In some embodiments, a method for selectively presenting augmented reality information includes detecting a direction-of-view of a user 705, determining or selecting at least one real-world object 710 less than a first predetermined distance D1 from the user in a field of view 715 associated with the determined direction-of-view of the user 705, determining or selecting at least one real-world object 720 between the first predetermined distance D1 of the user 705 and a second predetermined distance D2 from the user 705, augmenting the at least one real-world object 710 less than the first predetermined distance D1 for a first time period $t_1$, and augmenting the at least one real-world object 720 between the first predetermined distance D1 of the user and a second predetermined distance D2 for a second time period $t_2$ subsequent to the first time period $t_1$. As shown, a first sphere of relevance 730 may be defined as the region between the user and the first predetermined distance D1, and a second sphere of relevance 740 may be defined as the region between the first predetermined distance D1 and the second predetermined distance D2.

In some embodiments, rather than detecting a direction of view of the user, a field of view of the user may be known or obtained, and real-world objects in the field of view selected.

In some embodiments, a second time period may be triggered or initiated by an input from the user, such as a voice command ("go on", etc.), selection input (button press, etc.), or signal of intent from the user. For example, this may permit a user to take their time to evaluate the augmented objects. In some embodiments, there may be a transition period between the first and second time periods, such that the time periods may partially overlap. In other embodiments, the first and second time periods do not overlap.

In some embodiments, a user may select or otherwise adjust the predetermined distances used by the systems and methods herein. For example, a user may adjust a first predetermined distance to be smaller for a scenario where many objects are going to be near the user, or adjust the distance to be greater for a scenario where objects are far apart. In some embodiments, the second predetermined distance (or others after the first distance) may be adjusted by the user after augmentation of objects within the first predetermined distance. For example, the user may see an object some distance away from the augmented objects (e.g., something far off that may fall into a third, fourth, or the like distance or sphere), and provide an input to the system (such as a voice command, button input, slider movement, etc.) to adjust the range where a subsequent grouping of real-world objects will be augmented.

In some embodiments, the predetermined distances may be determined by the system in response to context aware analysis, such as evaluation of the number and location of real-world objects around the user.

In one embodiment, there is a method for selectively presenting augmented reality information, comprising: detecting a direction-of-view of a user; determining at least one real-world object less than a first predetermined distance from the user in a field of view associated with the determined direction-of-view of the user; determining at least one real-world object between the first predetermined distance of the user and a second predetermined distance from the user; augmenting the at least one real-world object less than the first predetermined distance for a first time period; and augmenting the at least one real-world object between the first predetermined distance of the user and a second predetermined distance for a second time period subsequent to the first time period. The method may include wherein augmenting the at least one real-world objects comprises displaying an augmented reality (AR) object associated with a respective real-world object. The method may also include wherein the AR object is displayed in a sphere of relevance determined by a distance of the real-world object from the user. The method may further comprise augmenting the third real-world object. The method may also include wherein the third real-world object is within the first predetermined distance, and augmented at a third time period subsequent to the second time period. The method may include wherein the first time period and second time periods are fixed durations. The method may further comprise detecting a change in direction-of-view of the user; and augmenting real-world objects within the first pre-determined distance. The method may include wherein the first and second predetermined distances define first and second spheres of relevance, respectively.

In one embodiment, there is a method for selecting augmented reality (AR) information about one or more real-world objects for display in a user's view, the method comprising: receiving one or more pairs of information, each pair comprising (i) information identifying a real-world object by geospatial coordinates, and (ii) an associated AR object including information about the real-world object; determining two or more spheres of relevance, each sphere of relevance centered on the user, and having a corresponding radius; and determining a relevant sphere for presentation to the user, and responsively displaying AR objects from among the received real-world objects whose coordinates lie within the current relevant sphere and within no inner sphere, and not displaying any other AR objects. The method may include wherein determining the relevant sphere comprises determining there is no prior case or if the user's view has changed substantially, and responsively setting the relevant sphere to an innermost sphere within which at least one real-world object lies. The method may also include wherein determining the relevant sphere comprises determining a new pair of real-world object and AR object is received that was not present in a previous iteration, and responsively setting the relevant sphere to a sphere associated with the new real-world object. The method may also include wherein determining the relevant sphere comprises determining a current relevant sphere has not changed for a predetermined duration, and responsively setting the relevant sphere to the next sphere of relevance in a predetermined iteration sequence. The method may also include wherein the predetermined iteration sequence goes from inner-most spheres of relevance to outer-most spheres of relevance. The method may also include wherein if the current relevant sphere is the outer-most sphere of relevance, the subsequent relevant sphere is the inner-most sphere of relevance.

In one embodiment, there is a method comprising: receiving one or more pairs of information, each pair comprising (i) information identifying a real-world object and (ii) an associated augmented reality (AR) object including information about the real-world object; selecting a relevant sphere from a plurality of spheres of relevance, each sphere of relevance having an associated radius; and displaying AR objects associated with real-world objects located within the selected relevant sphere to a user. The method may include wherein selecting the relevant sphere comprises: identifying a substantial change in the user's gaze, and selecting an inner-most sphere of the plurality of spheres of relevance as the relevant sphere. The method may also include wherein the inner-most sphere is the inner-most sphere including at least one pair of information. The method may include wherein selecting the relevant sphere comprises identifying a new pair of information not present in a previous iteration, and responsively setting the relevant sphere to the sphere of relevance associated with the new pair of information. The method may include wherein selecting the relevant sphere comprises identifying no new pair of information has been received for a predetermined duration, and responsively setting the relevant sphere as a next sphere in a predetermined iteration sequence. The method may also include wherein the predetermined iteration sequence cyclically iterates from spheres of relevance in increasing radii. The method may also include wherein the predetermined iteration sequence cyclically iterates from spheres of relevance in decreasing radii. The method may include wherein each pair of information includes 3-dimensional coordinates $<x_c, y_c, z_c>$ for the real-world object and the AR object.

In one embodiment, there is a method comprising: setting a user frame-of-reference; receiving a list of pairs, each pair including 3-D coordinates of a real-world object and an AR object; transforming each pair into the user frame-of-reference; determining a plurality of spheres of relevance, each sphere having an associated radius; determining a relevant sphere of the plurality of spheres of relevance by: determining if a new list of pairs is substantially different than a previous iteration, and if so setting the relevant sphere to an inner-most non-empty sphere of relevance; determining if the received list includes one or more new pairs, and if so setting the relevant sphere to the innermost sphere of relevance with associated with at least one of the one or more new pairs; determining if the relevant sphere is unchanged for a preset duration, and if so setting the sphere with the next largest radius as the relevant sphere; and displaying AR objects associated with real-world objects within the determined relevant sphere. The method may include wherein determining that the new list of pairs are substantially different comprises calculating a Jaccard index. The method may also include wherein a Jaccard index of less than 0.8 determines that the new list of pairs is substantially different from the current list of pairs.

In one embodiment, there is an apparatus comprising: a) an augmented reality (AR) application configured to receive location information from a sensor aggregator, and to responsively generate one or more pairs of real-world and AR objects; b) an AR sphere constructor configured to: receive (i) the one or more pairs from the AR application and (ii) a previous list of pairs from a history device; provide the one or more pairs received from the AR application to the history device; construct one or more spheres of relevance; set a relevant sphere based on changes to the receive list of pairs; and select AR objects associated with real-world objects within the relevant sphere; and c) an AR display configured to display a scene including the selected AR objects. The apparatus may include wherein the AR display comprises an AR head-mounted display (HMD). The apparatus may include wherein the AR display comprises a screen.

The apparatus may also include wherein the screen is transparent. The apparatus may also include wherein the screen is opaque and displays a video of the user's environment. The apparatus may include wherein the sensor aggregator is configured to obtain sensor information from one or more sensors. The apparatus may also include wherein the one or more sensors comprises a depth camera. The apparatus may also include wherein the one or more sensors comprises a global positioning system (GPS). The apparatus may also include wherein the one or more sensors comprises a compass. The apparatus may also include wherein the one or more sensors comprises a depth sensor. The apparatus may also include wherein the one or more sensors comprises a camera.

In one embodiment, there is a method comprising: receiving a list of information pairs, each information pair comprising information about a real-world object and an associated augmented reality (AR) object; generating one or more spheres of relevance; and selecting a sphere of relevance based at least in part on one of the received list of information pairs. The method may further comprise displaying a scene including the real-world object and associated AR object of the one of the received list of information pairs. The method may include wherein selecting the sphere of relevance comprises identifying the received list of information pairs is different than a previously received list of information pairs. The method may also include wherein a Jaccard index is used to compare the received list of information pairs and the previously received list of information pairs. The method may also include wherein selecting the sphere of relevance comprises selecting an inner-most sphere of relevance associated with one of the pairs in the received list of information pairs. The method may include wherein selecting the sphere of relevance comprises identifying that the received list of information pairs is within a threshold of being the same as a previously received list of information pairs, and further comprise selecting the next sphere of relevance in a predetermined iteration sequence. The method may also include wherein each sphere of relevance has an associated radius. The method may also include wherein the predetermined iteration sequence cyclically selects spheres of relevance in an increasing-radius direction. The method may also include wherein the predetermined iteration sequence cyclically selects spheres of relevance in a decreasing-radius direction.

In one embodiment, there is a method comprising: identifying a plurality of real-world objects having respective associated annotation information and respective distances from a user; cyclically displaying to the user, on an augmented reality display, at different times: (i) a first subset of annotations for those real-world objects having a first range of distances, and (ii) at least a second subset of annotations for those real-world objects having a second range of distances that does not overlap with the first range. The method may include wherein the cyclic display of the annotations comprises, in each cycle, displaying subsets of annotations in order of increasing distances. The method may further comprise, in response to detection of a new real-world object having an associated new-object annotation and a distance from the user within an Nth range of distances, interrupting the cyclic display order to next display the Nth subset of annotations including the new-object annotation. The method may further comprise, in response to a substantial change of viewing direction by the user, interrupting the cyclic display order to next display the subset of annotations having the lowest distance.

In one embodiment, there is a method for selecting augmented reality information about one or more real-world objects for display in a user's view comprising, iteratively, the method comprising: a) receiving one or more pairs of information, each pair comprising (i) information about a real-world object identified by its geospatial coordinates and (ii) an associated AR object, the associated AR object specifying and rendering associated augmented information; b) determining two or more shapes of relevance of increasing size and centered on the user; c) determining a relevant shape for current presentation to the user, wherein determining comprises: if there is no prior case or if the user's view has changed substantially, then setting the relevant shape as the innermost shape within which at least one received real-world object lies; otherwise, if a pair of real-world object and AR object is received that was not present in the pairs received in the previous iteration, then setting the relevant shape to the shape centered on the user's eyes associated with the nearest newly received real-world object; otherwise, if the relevant shape has not changed over a preset duration, then setting the relevant shape to the next larges shape centered on the user's eyes, and cycling back to the innermost shape if the current shape is the outermost of the shapes; and d) displaying AR objects associated with the received real-world objects, the AR objects having coordinates laying (i) within the current relevant shape and (ii) not within any inner shapes, and not displaying any AR objects having coordinates outside the relevant sphere. The method may include wherein the associated augmented information includes a name and other attributes of the real-world object. The method may include wherein the shapes of relevance are spheres. The method may also include wherein spheres whose diameters increase in some progression determined by radius. The method may also include wherein each consecutive sphere of relevance has a radius of 5 meters, 10 meters, and 25 meters. The method may include wherein the shapes of relevance are cubes. The method may include wherein the user's view changing comprises a change of the user's location. The method may include wherein the user's view changing comprises user's head movement. The method may include wherein the user's view changing comprises a change of the user's posture. The method may include wherein if all objects previously displayed in the current shape move out of that shape, then the method sets the relevant shape to the next shape in the rotation. The method may further comprise displaying at least one other AR objects besides those that lie within the current most relevant shape.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for selectively presenting augmented reality (AR) information, comprising:
   detecting a plurality of real-world objects in a field of view of a user;
   selecting from the plurality of real-world objects a first group of at least one real-world object within a first shape having a first size;
   selecting from the plurality of real-world objects a second group of at least one real-world object outside the first shape and within a second shape having a second size larger than the first size;
   augmenting the first group of real-world objects at a first time; and
   augmenting the second group of real-world objects at a second time after the first time;
   wherein the first size and the second size are selected based at least in part on the locations of each of the detected plurality of real-world objects.

2. The method of claim 1, further comprising stopping augmentation of the first group of real-world objects prior to the second time.

3. The method of claim 1, further comprising:
   selecting from the plurality of real-world objects a third group of at least one real-world object outside the second shape; and
   augmenting the third group of real-world objects at a third time after the second time.

4. The method of claim 1, wherein the first shape and the second shape are cubes.

5. The method of claim 1, wherein the first shape and the second shape are ovoids.

6. The method of claim 1, wherein the first shape and the second shape are spheres.

7. The method of claim 1, wherein the first shape and the second shape are substantially centered on the user.

8. An apparatus comprising a processor configured to perform:
   detecting a plurality of real-world objects in a field of view of a user;
   selecting from the plurality of real-world objects a first group of at least one real-world object within a first shape having a first size;
   selecting from the plurality of real-world objects a second group of at least one real-world object outside the first shape and within a second shape having a second size larger than the first size;
   augmenting the first group of real-world objects at a first time; and
   augmenting the second group of real-world objects at a second time after the first time;
   wherein the first size and the second size are selected based at least in part on the locations of each of the detected plurality of real-world objects.

9. The apparatus of claim 8, wherein the processor is further configured to stop augmentation of the first group of real-world objects prior to the second time.

10. The apparatus of claim 8, wherein the processor is further configured to perform:
    selecting from the plurality of real-world objects a third group of at least one real-world object outside the second shape; and
    augmenting the third group of real-world objects at a third time after the second time.

11. The apparatus of claim 8, wherein the first shape and the second shape are cubes.

12. The apparatus of claim 8, wherein the first shape and the second shape are ovoids.

13. The apparatus of claim 8, wherein the first shape and the second shape are substantially centered on the user.

14. A method for selectively presenting augmented reality (AR) information, comprising:
    detecting a plurality of real-world objects in a field of view of a user;
    selecting from the plurality of real-world objects a first group of at least one real-world object less than a first distance from the user in the field of view;
    selecting from the plurality of real-world objects a second group of at least one real-world object in the field of view of the user between the first distance and a second distance from the user greater than the first distance;
    augmenting the first group of real-world objects at a first time; and
    augmenting the second group of real-world objects at a second time after the first time;
    wherein the augmenting of at least the first and second group of real-world objects is performed cyclically, each group being augmented at different times in each of a plurality of cycles.

15. The method of claim 14, further comprising stopping augmentation of the first group of real-world objects prior to the second time.

16. The method of claim 14, wherein augmenting a real-world object comprises displaying an AR object associated with the real-world object.

17. The method of claim 14, further comprising:
    selecting from the plurality of real-world objects a third group of at least one real-world object in the field of view of the user beyond the second distance; and
    augmenting the third group of real-world objects at a third time after the second time.

18. The method of claim 14, wherein the first time has a first preset duration and the second time has a second preset duration.

19. The method of claim 14, further comprising:
    detecting, prior to augmenting the second group of real-world objects, an additional real-world object in the field of view of the user; and
    augmenting the additional real-world object at a third time.

20. The method of claim 14, further comprising:
    detecting a change in the field of view of the user;
    detecting an updated plurality of real-world objects in the changed field of view of the user;
    selecting from the updated plurality of real-world objects a third group of at least one real-world object less than the first distance from the user in the changed field of view;
    selecting from the updated plurality of real-world objects a fourth group of at least one real-world object in the field of view of the user between the first distance and the second distance;
    augmenting the third group of real-world objects at a third time; and augmenting the fourth group of real-world objects at a fourth time after the third time.

\* \* \* \* \*